(12) United States Patent
Oka

(10) Patent No.: US 7,830,788 B2
(45) Date of Patent: *Nov. 9, 2010

(54) MOBILE COMMUNICATION NETWORK SYSTEM

(75) Inventor: Kazuyuki Oka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 530 days.

This patent is subject to a terminal disclaimer.

(21) Appl. No.: 11/705,093

(22) Filed: Feb. 12, 2007

(65) Prior Publication Data

US 2007/0147392 A1 Jun. 28, 2007

Related U.S. Application Data

(63) Continuation of application No. PCT/JP2004/011588, filed on Aug. 12, 2004.

(51) Int. Cl.
*G01R 31/08* (2006.01)

(52) U.S. Cl. .................. 370/218; 370/338; 455/432.1; 455/435.1

(58) Field of Classification Search .............. 455/432.1, 455/435.1; 370/318, 338, 328, 310, 217
See application file for complete search history.

(56) References Cited

U.S. PATENT DOCUMENTS

| | | | | |
|---|---|---|---|---|
| 5,594,942 | A * | 1/1997 | Antic et al. ................. | 455/423 |
| 6,223,038 | B1 * | 4/2001 | Iseyama et al. .......... | 455/435.3 |
| 6,594,490 | B1 * | 7/2003 | Ushiki et al. ................ | 455/433 |
| 7,436,762 | B2 * | 10/2008 | Oka et al. .................... | 370/218 |
| 2001/0046223 | A1 * | 11/2001 | Malki et al. ................. | 370/338 |
| 2003/0104807 | A1 | 6/2003 | Momona | |

(Continued)

FOREIGN PATENT DOCUMENTS

| | | |
|---|---|---|
| JP | 2002-186010 | 6/2002 |
| JP | 2003-174471 | 6/2003 |
| JP | 2003-235065 | 8/2003 |
| JP | 2004-96193 | 3/2004 |

OTHER PUBLICATIONS http://www.ietf.org/rfc/rfc3220.txt.
http://www.ietf.org/internet-drafts/draft-ietf-mobileip-ipv6-24.txt.

(Continued)

*Primary Examiner*—Lewis G West
*Assistant Examiner*—Dung Hong
(74) *Attorney, Agent, or Firm*—Staas & Halsey LLP

(57) ABSTRACT

If a trouble, which occurred in a node managing positional information, has been solved, the positional information can be restored only by transmitting a position registration request addressed to one multicast address without need to transmit multiple position registration requests addressed to multiple mobile terminals (MN). There are included a home agent, a mobile anchor point and a communication node, each of which is a node connected to a network. Each node receives a position registration from a mobile terminal, copies a binding cache to produce a backup binding cache, and maintains and manages the backup binding cache. When recovering from a trouble, each of the home agent, mobile anchor point and communication node searches for the backup binding cache to acquire the binding cache held before occurrence of the trouble; then designates an already registered multicast address for a mobile terminal stored in the acquired binding cache; sends a packet of position registration request to the mobile terminal; regards the acquired binding cache as being valid when a response to the position registration request packet is received from the mobile terminal; and then continues to maintain and manage the acquired binding cache.

16 Claims, 41 Drawing Sheets

U.S. PATENT DOCUMENTS

2004/0049532 A1  3/2004 Oka et al.
2005/0213545 A1* 9/2005 Choyi et al. ................ 370/338

OTHER PUBLICATIONS http://www.ietf.org/internet-drafts/draft-ietf-mobileip-hmipv6-04.txt.

http://www.ietf.org/rfc/rfc2460.txt.

Kazuyuki Oka et al., "Mobile IP no Kakucho-Ichi Toroku Joho no Fukkyu/Rute Saitekika Seigyo Hoshiki-", FIT (Joho Kagaku Gijutsu Forum) 2002, Sep. 13, 2002, M-29, pp. 91 to 92.

International Search Report of the International Application PCT/JP2004/011588 (mailed on Nov. 22, 2004.

* cited by examiner

FIG. 1B

| ITEM NUMBR | ITEM | MEANING | REMARK |
|---|---|---|---|
| 1 | Home Address | ADDRESS ON HOME LINK OF MN | BECOMES KEY WHEN SEARCHING BACKUP-BC |
| 2 | Care-of Address | CARE-OF ADDRESS ON MOVEMENT DESTINATION LINK OF MN | |
| 3 | Life Time | VALID PERIOD OF BINDING CACHE | |

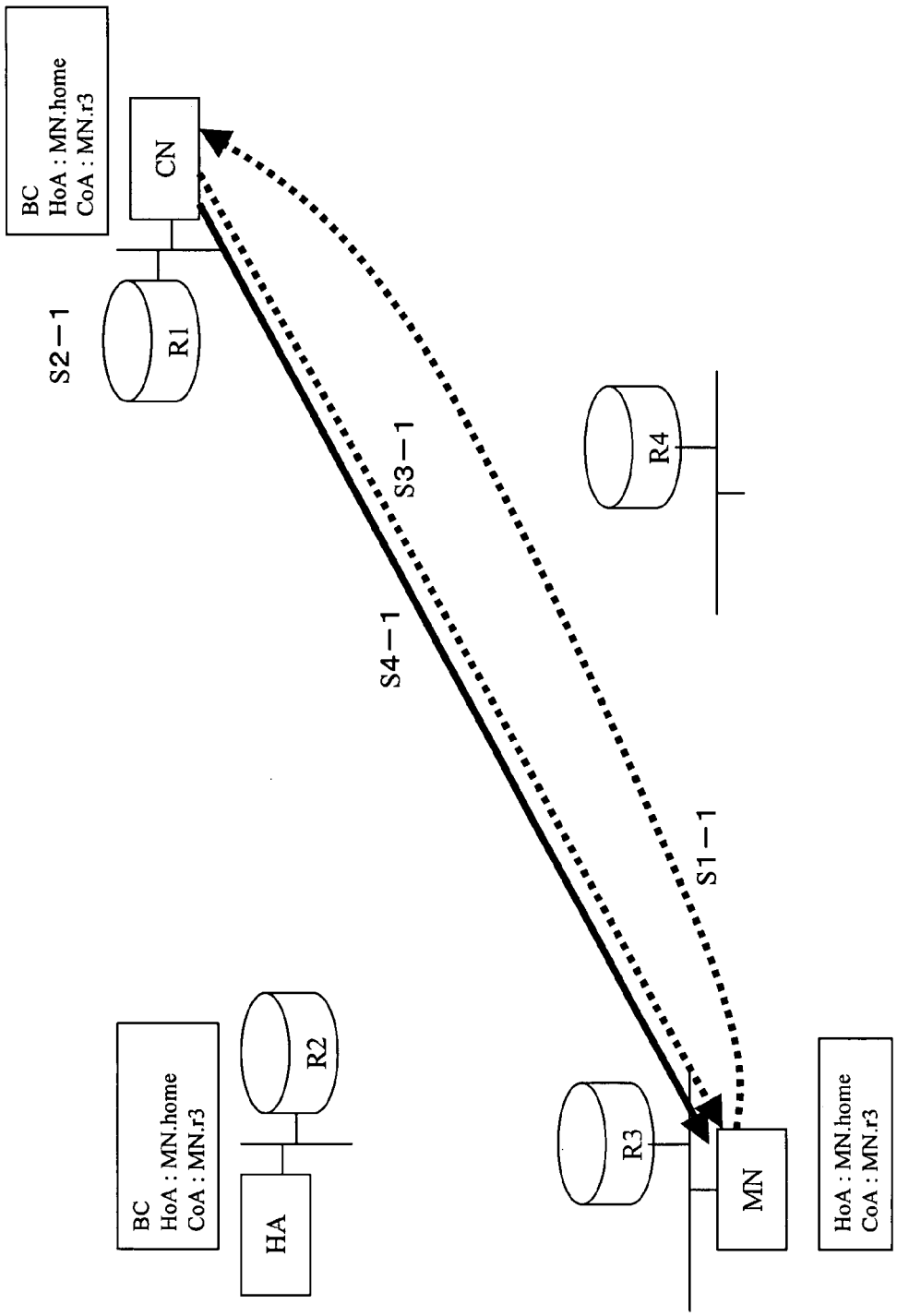

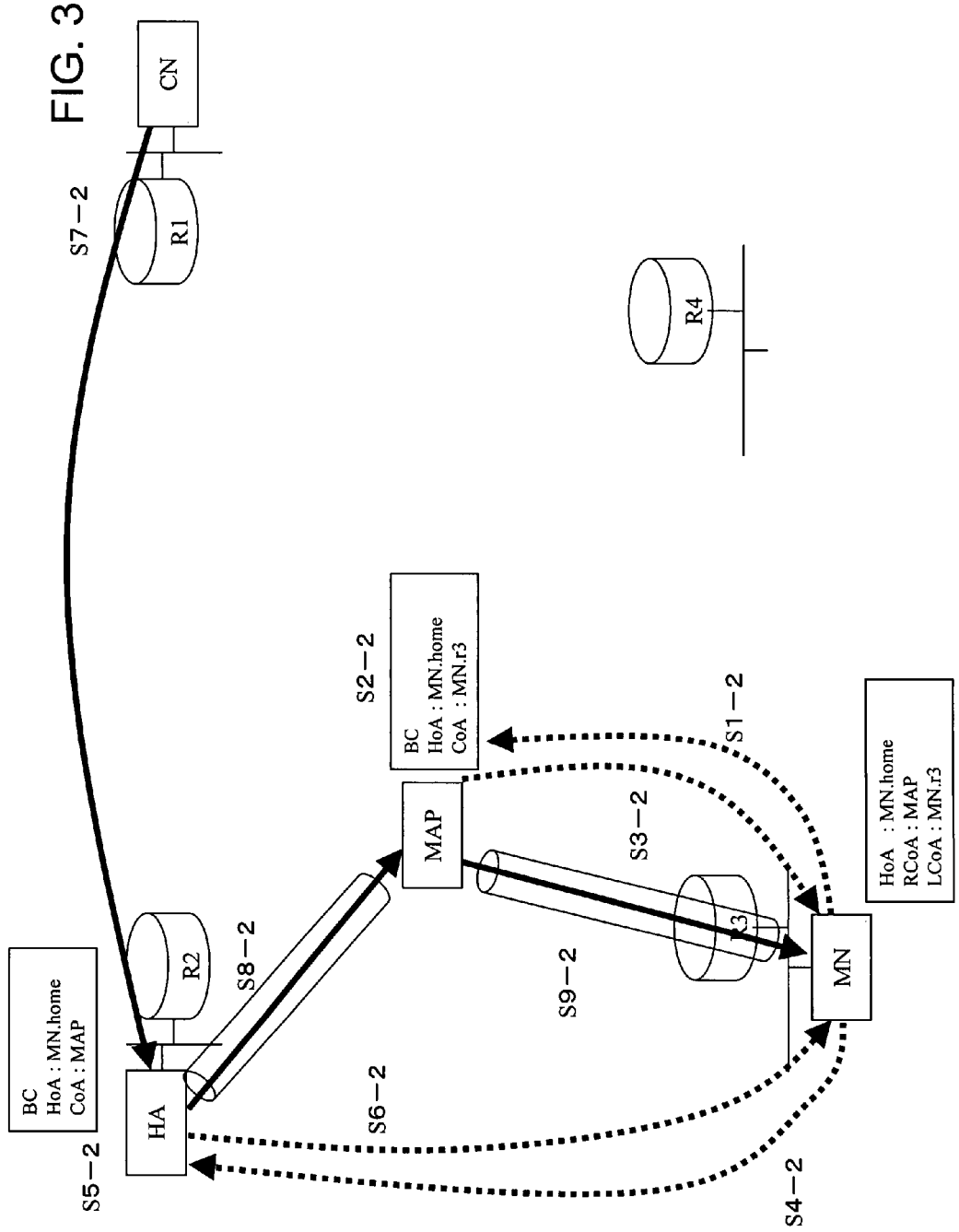

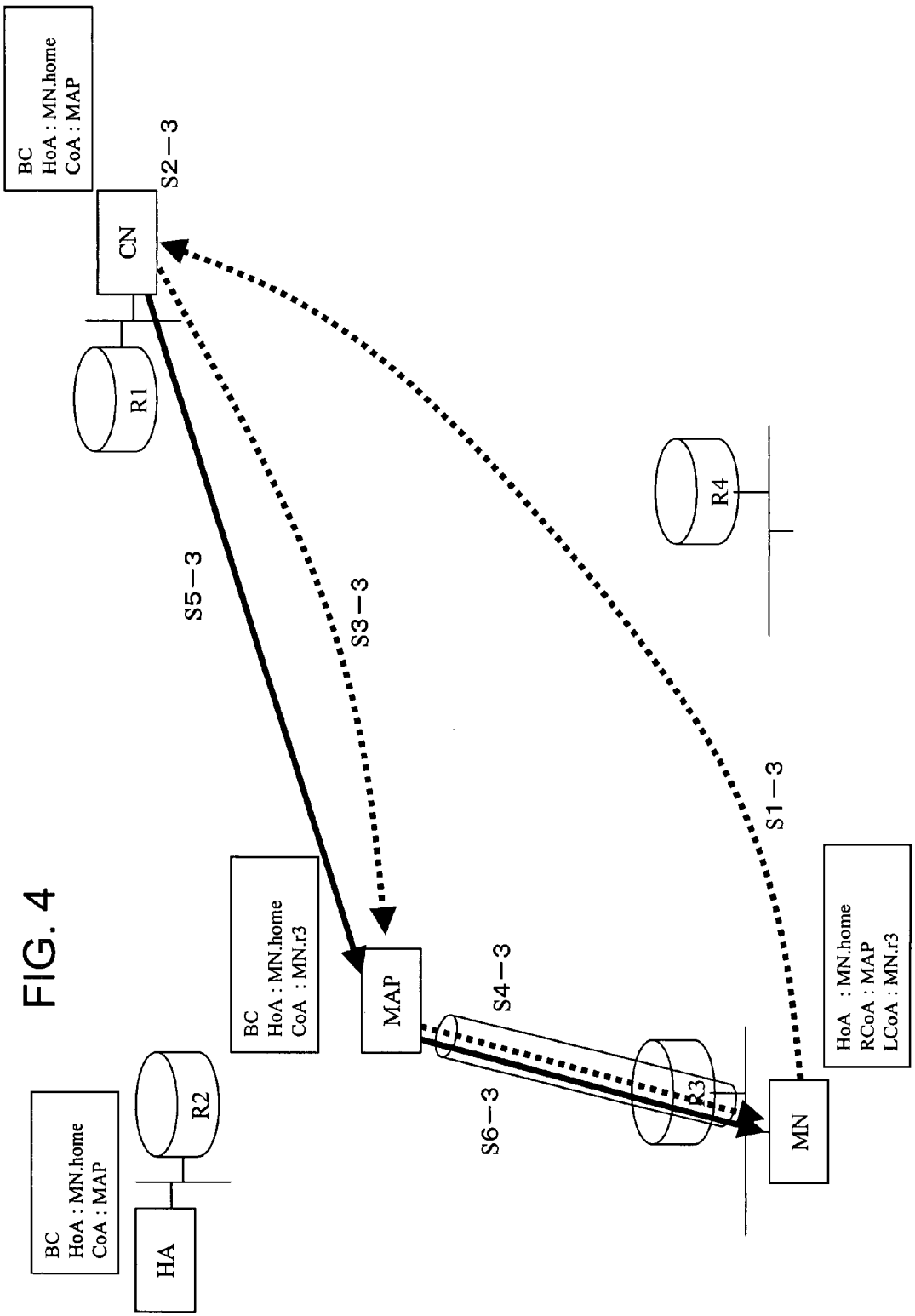

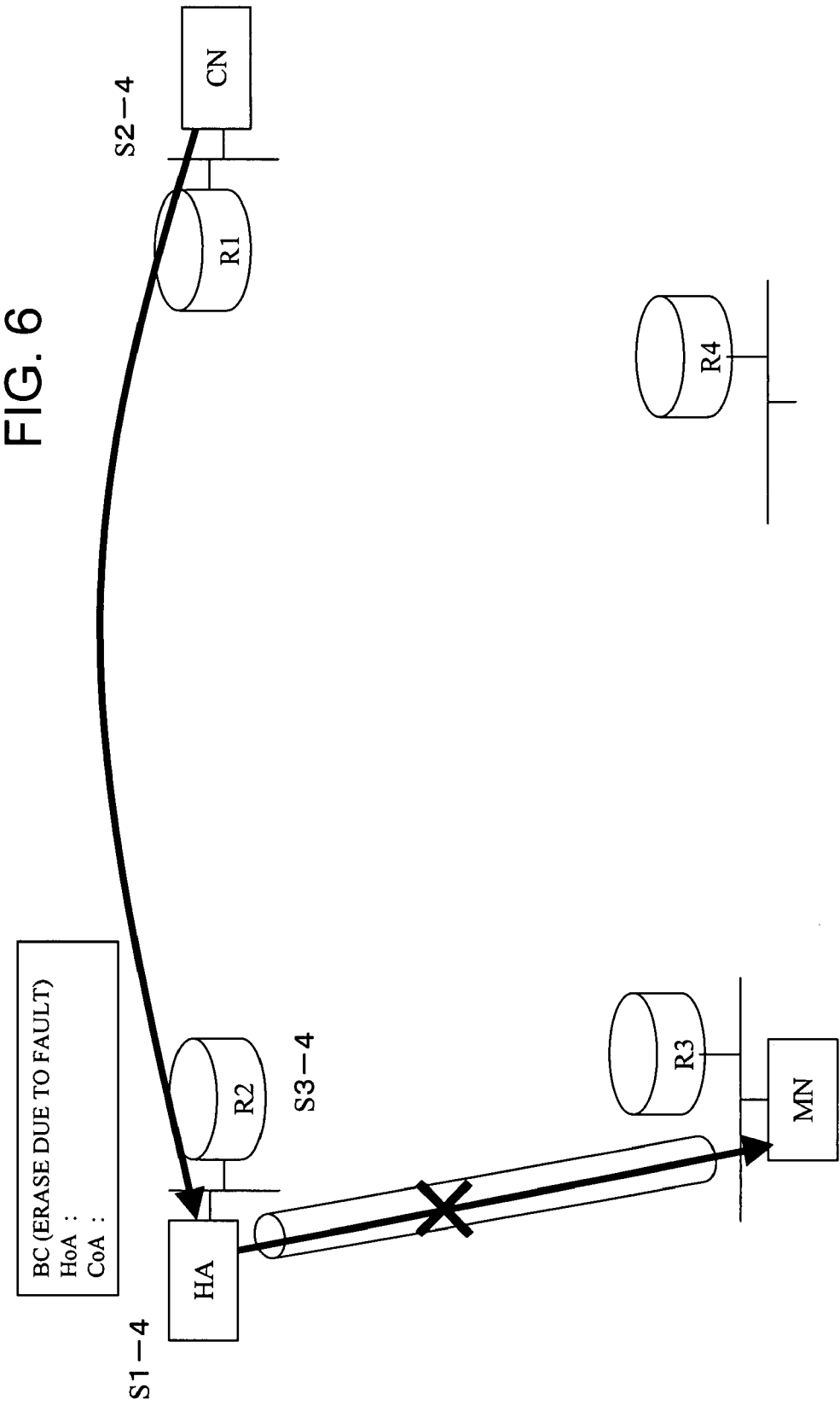

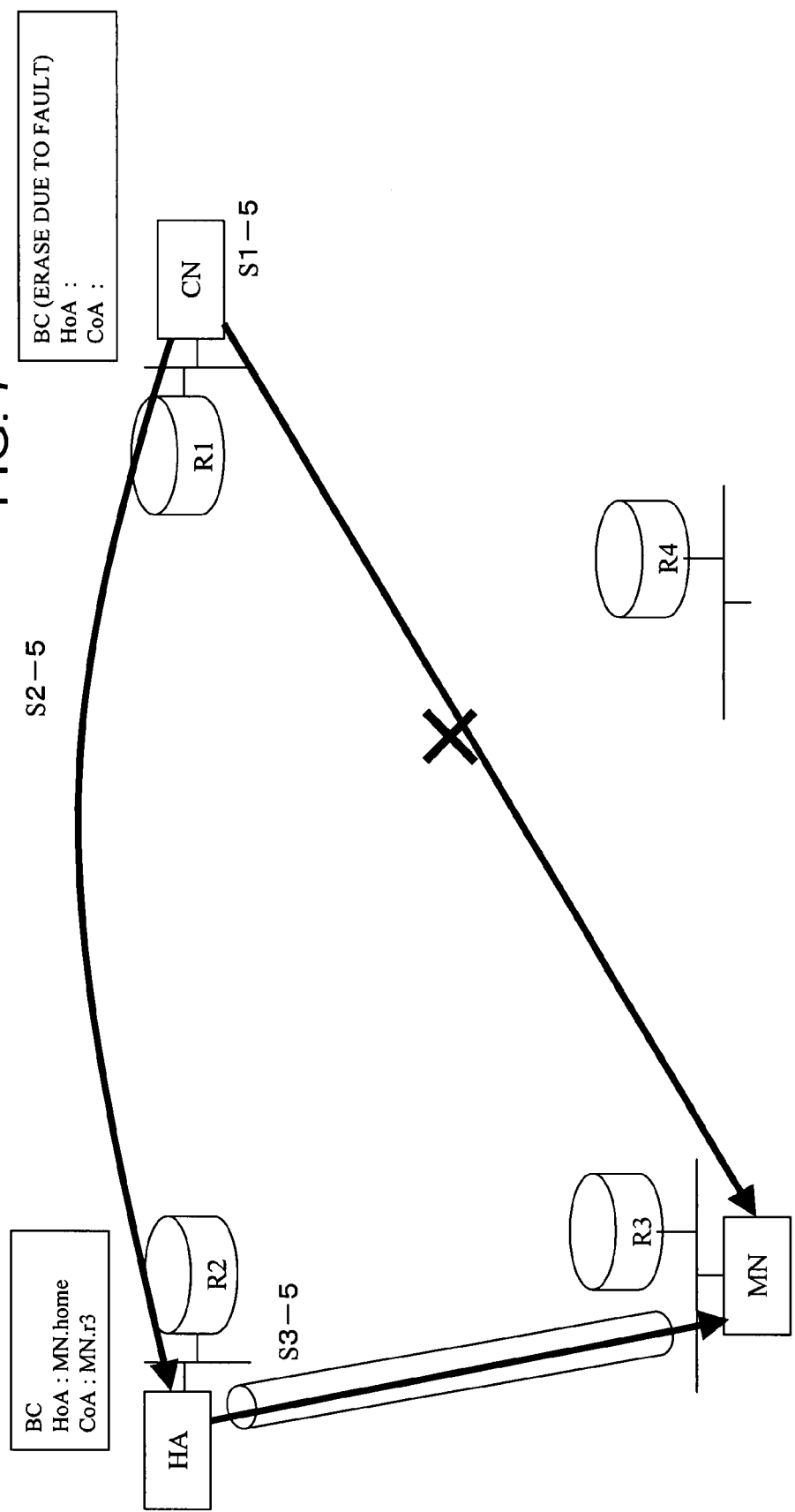

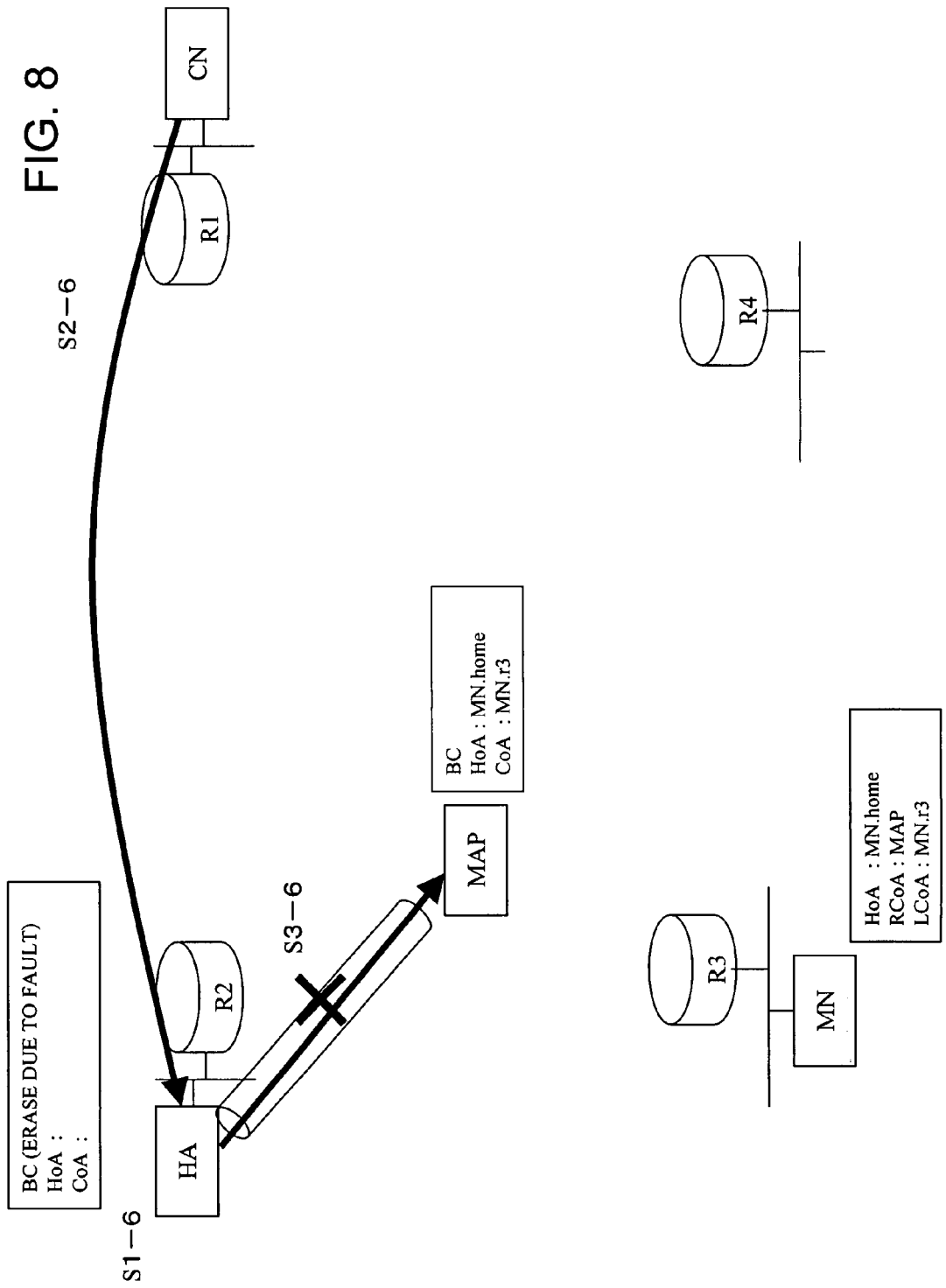

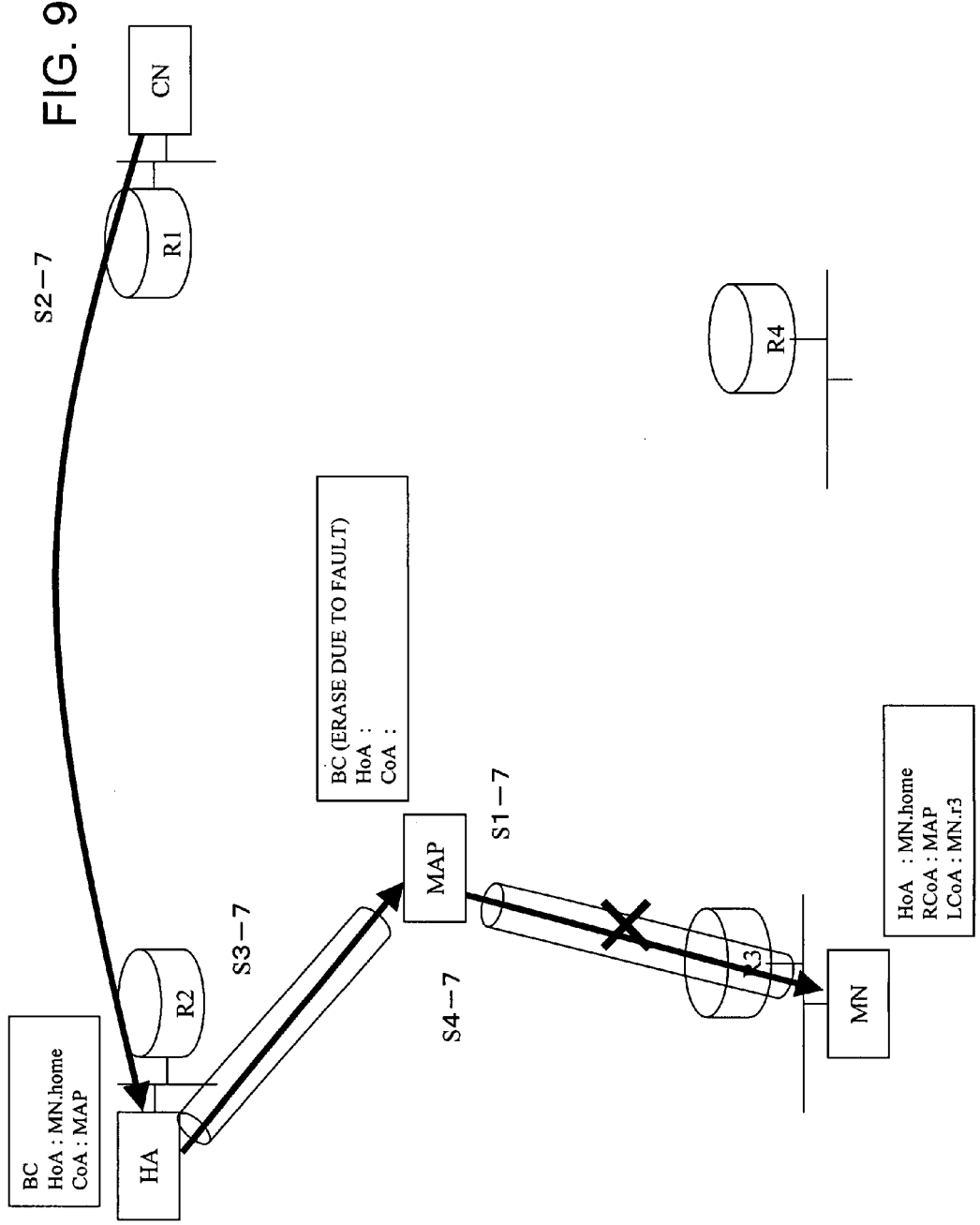

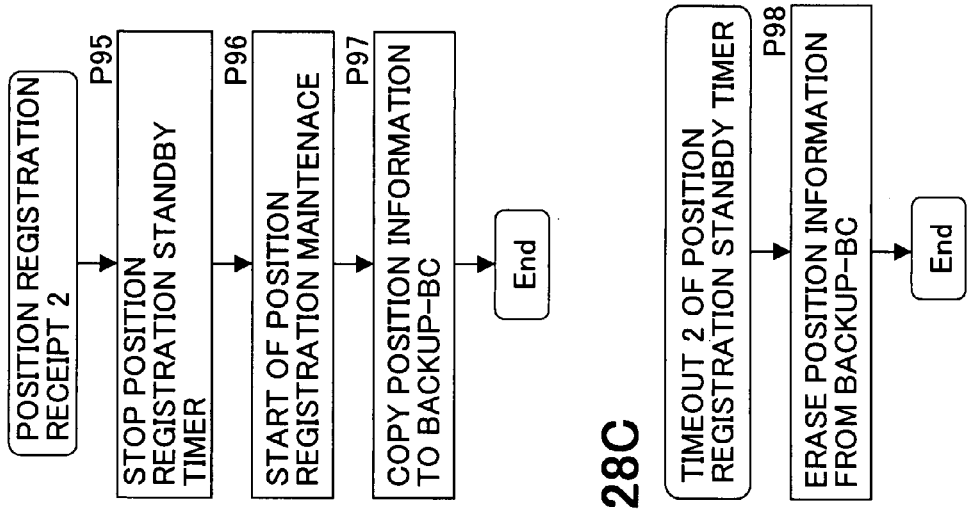
FIG. 28B
FIG. 28C
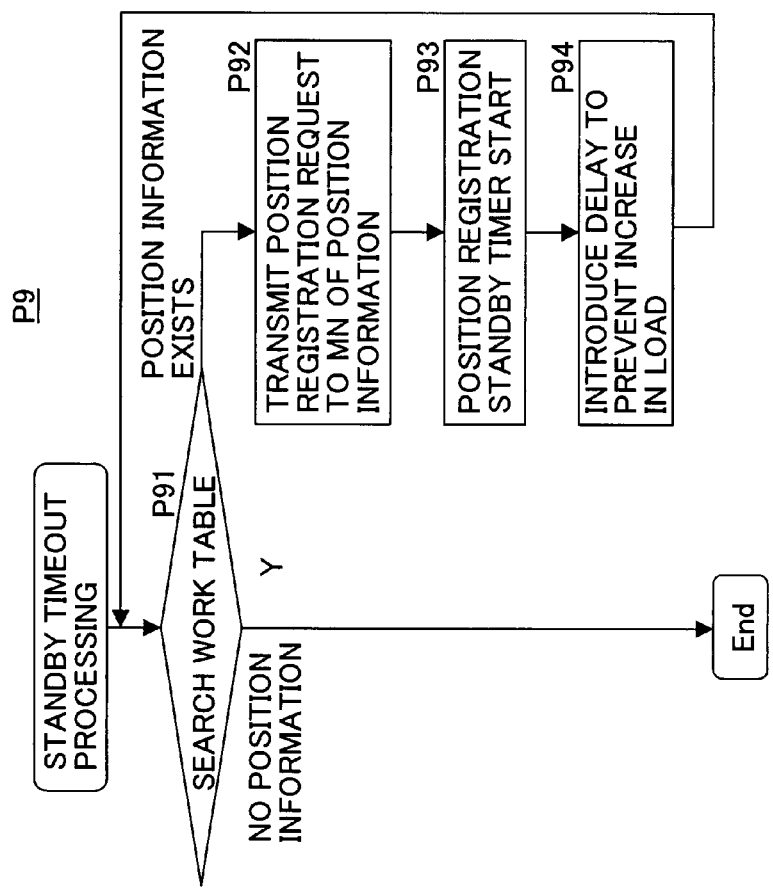
FIG. 28A

MOBILE COMMUNICATION NETWORK SYSTEM

CROSS-REFERENCE TO RELATED APPLICATIONS

This application is a continuation of international application PCT/JP2004/011588, filed on Aug. 12, 2004.

BACKGROUND ART

The present invention relates to a mobile communication network to which Mobile-IP is applied and which manages the positions of mobile terminals and performs recovery of position information.

TECHNICAL FIELD

In an IP network that performs communication using the Internet protocol (IP), mobile terminals (MN) such as portable computers and cellular phone terminals that are connected to the Internet via a home agent (HA) which is a node perform positional registration in a mobile communication network that uses mobile-IP (MIP) (See non-patent document 1) by reporting position information for their own node to the corresponding home agent (HA).

The position information reported by the home agent is maintained as a binding cache (BC). In addition, the home agent performs a binding-cache dependent transfer of packets which are addressed to a mobile terminal from a correspondent node (CN).

Further, when positional registration is performed with respect to the correspondent node in order to optimize the path, the correspondent node transmits packets directly to the mobile terminal without bypassing the home agent in accordance with the binding cache.

This is also similar to mobile-IPv6 (MIPv6) which is the Internet protocol 6(IPv6) version of mobile IP (MIP) (See non-patent document 2), for example.

Furthermore, this is also similar to hierarchical mobile-IP (HMIP) (See non-patent document 3, for example), which supports a high-speed handover through the installation of a mobility anchor point (MAP) which is a node equivalent to a proxy home agent in the movement destination network of the mobile terminal, and hierarchical mobile-IPv6 (HMIPv6), which is the version of the Internet protocol 6 (IPv6) (See non-patent document 4).

In this mobile communication network, the home agent HA, the correspondent node CN, and the mobile anchor point MAP constituting the nodes are capable of transferring packets from the correspondent node CN to the mobile terminal MN by maintaining position information reported by the mobile terminal MN as a binding cache BC.

Thereupon, when a fault occurs in each node holding the binding cache BC that is registered by the mobile terminal MN, even when the node is restored after the fault, unless the holding binding cache BC is restored, the packet transfer from the correspondent node CN to the mobile terminal MN is not performed.

Normally, when a fault occurs with each node holding the binding cache BC, the restoration of the binding cache BC depends on a repositioning registration request using optional timing from the mobile terminal MN. However, in the corresponding case, packets addressed to the mobile terminal from the correspondent node CN do not arrive or do not arrive via the intended path (that is, the path is not optimized).

The present inventor formerly proposed an invention for solving such an inconvenience (See Patent document 1). In the invention formerly proposed by the present inventor, a system in which each node in which a fault has occurred autonomously performs a recovery operation for the binding cache BC is also included. However, this system is still confronted by the problem that, because packets for recovery are transmitted to a unicast address of the binding cache BC in which its own node is held during recovery of the binding cache BC, congestion for recovery occurs directly after fault recovery.

As other related technology, a variety of inventions have previously been proposed.

For example, when transferring packets from the communication destination host to the mobile communication terminal, the encapsulation of the packets and transfer thereof to a multicast address has been illustrated (See patent document 2).

As yet another invention, an arrangement whereby the movement of a mobile terminal is detected as a result of the home agent and a foreign agent transmitting multicast address packets at regular intervals has been illustrated (See patent document 3).

In addition, as another invention, the encapsulation of packets and transfer thereof to another multicast address when a local multicast packet is transferred to a mobile terminal has been illustrated (See patent document 4).

However, none of Patent document 1-4, Japanese Application Laid Open Nos. 2004-96193, 2003-235065, 2002-186010, and 2003-174471 touches on the relationship between the destination of a position registration request and a multicast.

Non-patent document 1:
   http://www.ietf.org/rfc/rfc3220.txt
Non-patent document 2:
   http://www.ietf.org/internet-drafts/draft-ietf-mobileip-ipv6-24.txt
Non-patent document 3:
   http://www.ietf.org/internet-drafts/draft-ietf-mobileip-hmipv6-04.txt
Non-patent document 4:
   http://www.ietf.org/rfc/rfc2460.txt
Patent document 1:
   Japanese Application Laid Open No. 2004-96193
Patent document 2:
   Japanese Application Laid Open No. 2003-235065
Patent document 3:
   Japanese Application Laid Open No. 2002-186010
Patent document 4:
   Japanese Application Laid Open No. 2003-174471

DISCLOSURE OF THE INVENTION

Therefore, an object of the present invention is to provide a mobile communication network system in which each node of the home agent/mobile anchor point is capable of performing a recovery of the binding cache BC by avoiding congestion during fault restoration.

The mobile communication network system according to the present invention that achieves the above object has a home agent and a mobile anchor point which are nodes each connected to a network, wherein each of the nodes receives a position registration from a mobile terminal, creates a backup binding cache by copying the binding cache, and maintains and manages the backup binding cache; and each of the home agent and mobile anchor point searches the backup binding cache in the event of fault recovery and acquires a binding cache that has been held prior to the fault, designates a preregistered multicast address for the mobile terminal stored in the acquired binding cache and sends a position registration request packet to the mobile terminal, renders the acquired binding cache valid when there is a response from the mobile terminal with respect to the position registration request packet and continues to maintain and manage the acquired binding cache, sends the position registration request packet to a unicast address of the mobile terminal when there is no response from the mobile terminal, and, when there is no response from the mobile terminal to the position registration request sent to the unicast address, renders the acquired binding cache invalid and deletes the acquired binding cache.

Furthermore, the mobile communication network system according to the present invention that achieves the above object makes a transmission including the multicast address to the mobile terminal by way of response to the registration of the position information from each of the home agent and the mobile anchor point.

In addition, the mobile communication network system according to the present invention that achieves the above object is such that the home agent and the mobile anchor point each use Mobile Internet Protocol.

Further, the mobile communication network system according to the present invention that achieves the above object is such that the home agent, mobile anchor point, and correspondent node each use Hierarchical Mobile Internet Protocol.

Furthermore, the mobile communication network system according to the present invention that achieves the above object is such that the mobile terminal uses Mobile Internet Protocol and, by means of a multicast address contained in a position information registration response, performs registration of a multicast group identifier (GRP-ID) by using a Multicast Listener Report of Internet Management Protocol (IGMP: Internet Group Management Protocol) in a neighboring router.

The features of the present invention will become more evident from the embodiment of the invention that is described by referencing the drawings hereinbelow.

BRIEF DESCRIPTION OF THE DRAWINGS

FIG. 1B shows a constitutional example of position information;

FIG. 2 shows an example of a path for position registration using mobile IPv6 path optimization and a packet transfer after position registration;

FIG. 3 shows an example of a path for position registration using hierarchical mobile IPv6 and a packet transfer after position registration;

FIG. 4 shows an example of a path for position registration using path optimization and a packet transfer after position registration with respect to the position registration using the hierarchical mobile IPv6 and packet transfer after position registration shown in FIG. 3;

FIG. 6 shows an example of a case where a fault has occurred in the home agent HA in mobile IPv6;

FIG. 7 shows an example of a case where a fault has occurred in the correspondent node CN in an example of registration of path optimization of mobile IPv6 shown in FIG. 2;

FIG. 8 shows an example of a case where a fault has occurred in the home agent HA in the hierarchical mobile IPv6 of FIG. 3;

FIG. 9 shows an example of a case where a fault has occurred in the mobile anchor point MAP in the hierarchical mobile IPv6 of FIG. 3;

FIGS. 28A-28C is a second flowchart for the binding cache recovery of the home agent HA;

BEST MODE FOR CARRYING OUT THE INVENTION

An embodiment of the present invention will be described hereinbelow with reference to the drawings. However, in order to facilitate an understanding of the present invention earlier, the problem of a conventional mobile communication network which constitutes the premise for the problem of the present invention will also be considered.

Figure 1A:
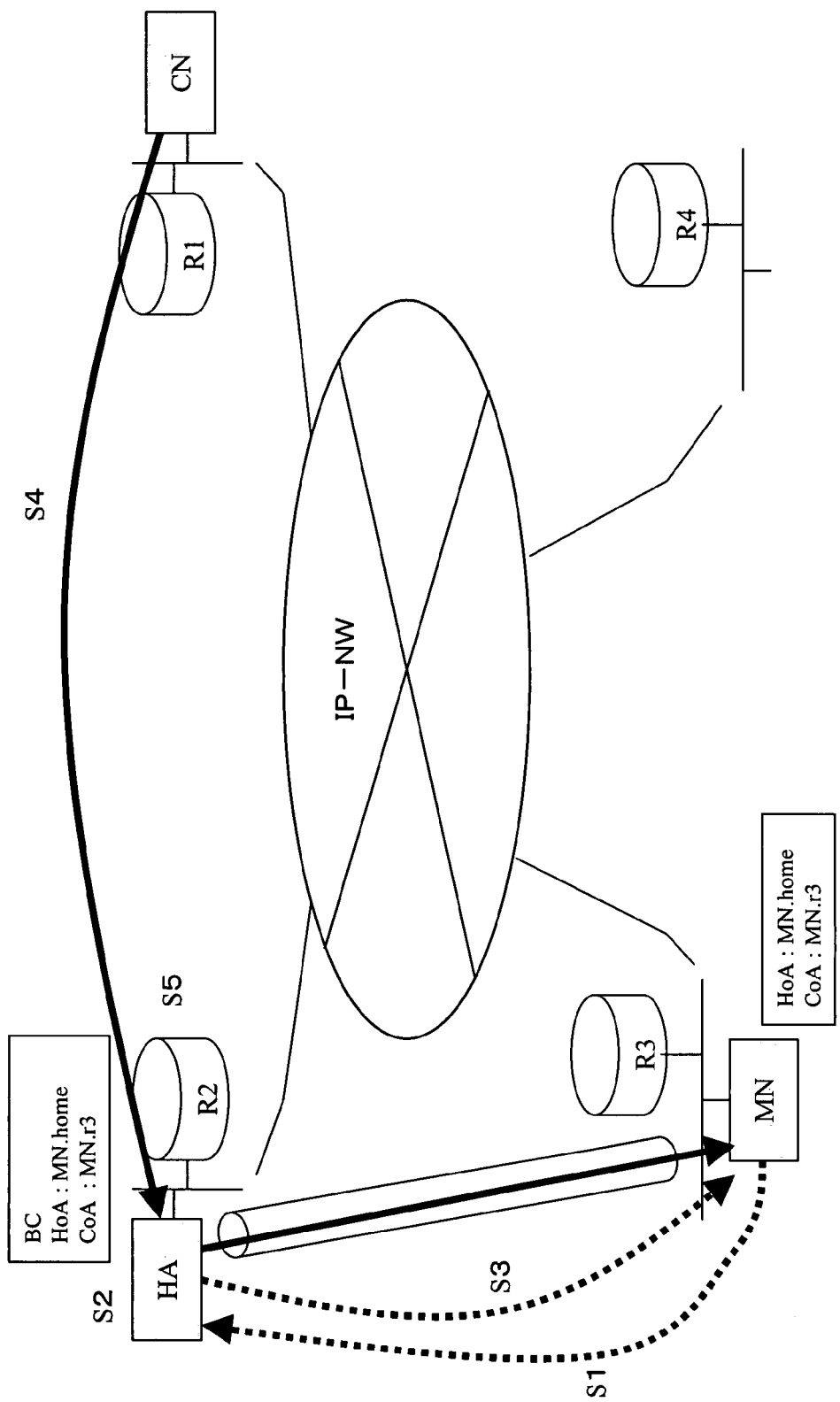
FIG. 1A shows an example of a path for position registration using mobile IPv6 and a packet transfer after position registration.

FIG. 1A shows an example of a path for position registration using mobile IPv6 and a packet transfer after position registration. R1 to R4 in FIG. 1A denotes routers. Networks belonging to the respective routers R1 to R4 are connected via an IP network IP-NW such as the Internet.

In FIG. 1A, when the mobile terminal MN moves from the registration position of the home network of the home agent HA that manages position registration in the network area to which a router R2 belongs to the network area to which a router R3 belongs, a care-of address (CoA) is obtained from a router advertising message that is sent at fixed intervals by the router R3 of the area constituting the movement destination via an external link.

The mobile terminal MN then transmits position registration information to the home agent HA (step S1).

When the home agent HA receives position registration information from the mobile terminal MN, position information is maintained as binding cache BC (step S2). The binding cache BC is maintained in correspondence with registered individual mobile terminals as the home address for the home agent HA.

Here, when this is tabulated in FIG. 1B, in order to illustrate the item and the corresponding meaning thereof, the position registration information from the mobile terminal MN which has moved to the network to which the router R3 belongs includes the home address (HoA:MN.home) which is the address on the home link of the mobile terminal MN, the mobile destination link state Care-of Address (CoA:MN.r3) of the mobile terminal MN, and the valid time of the binding cache (Life Time). Further, the home address mentioned above is a key for searching the backup binding cache (backup BC:BBC), which will be described subsequently, in accordance with the present invention.

When this is explained by returning to FIG. 1A, the home agent HA sends back a position registration response in response to the position registration from the mobile terminal MN (step S3).

However, when the correspondent node CN has not recognized the movement of the mobile terminal MN, the home agent HA transmits a packet to the home address (HoA:MN.home) of the mobile terminal MN (step S4).

In the home agent HA, packets from the correspondent node CN are picked up as packets addressed to the mobile terminal MN that holds the binding cache BC and the packets are encapsulated and transferred to a Care-of Address (CoA:MN.r3) in accordance with the binding cache BC (step S5).

Thus, even when the mobile terminal MN has moved from the home address (HoA) to the Care-of Address (CoA), packets to its own node from a correspondent node CN whose movement has not been recognized can be received.

FIG. 2 shows an example of a path for position registration using mobile IPv6 path optimization and a packet transfer after position registration. In each subsequent figure, the connection between each node and the IP network IP-NW is the same as that shown in FIG. 1A and omitted in order to simply the illustration.

As per FIG. 1A, when the mobile terminal MN has moved from a position that takes the area belonging to router R2 as the home network, the mobile terminal MN judges whether to implement path optimization and, when path optimization is implemented, transmits position registration information to the correspondent node CN (step S1-1).

When the correspondent node CN receives position registration information from the mobile terminal MN, the position information is managed as the binding cache BC (step S2-1). The correspondent node CN sends back a position registration response by way of response to the position registration from the mobile terminal MN (step S3-1). When the correspondent node CN transmits a packet to the mobile terminal MN, the packet is transmitted to the Care-of Address (CoA:MN.r3) in accordance with the binding cache BC (S4-1).

In the example in FIG. 2, packets can be transmitted directly to the mobile terminal MN from the correspondent node CN without passing via the home agent HA. As a result, packet processing by the home agent HA is omitted and the processing can be shortened and the path optimized.

Furthermore, FIG. 3 shows an example of a path for position registration using hierarchical mobile IPv6 and a packet transfer after position registration.

When the mobile terminal MN has moved in the hierarchical mobile IPv6, an on-Link Care-of Address (LCoA:MN.r3) and regional Care-of Address (RCoA:MAP) are obtained for the external link. As a result, position registration information for the onlink Care-of Address (LCoA) is transmitted as position information to the mobile anchor point (MAP: Mobility Anchor Point) (step S1-2).

When the mobile anchor point MAP receives position registration information from the mobile terminal MN, position information is managed as the binding cache BC (step S2-2). The mobile anchor point MAP sends back a position registration response by way of response to the position registration from the mobile terminal MN (step S3-2).

After transmitting position registration information to the mobile anchor point MAP, the mobile terminal MN also transmits position registration information to the home agent HA (step S4-2). Thereupon, a regional Care-of Address (RCoA) is used as position information.

When the home agent HA receives position registration information from the mobile terminal MN, the position information is managed as the binding cache BC (step S5-2). The home agent HA then sends back a position registration response by way of response to the position registration from the mobile terminal MN (step S6-2).

Here, when the correspondent node CN does not recognize the movement of the mobile terminal MN, the packets are transmitted to the home address (HoA) of the mobile terminal MN (step S7-2). The home agent HA acquires the packets as packets addressed to the mobile terminal MN that holds the binding cache BC and transfers the packets to the regional care-of address (RCoA:MAP) after encapsulating the packets in accordance with the binding cache BC (step S8-2).

The mobile anchor point MAP performs reverse encapsulation when receiving encapsulated packets addressed to the regional care-of address (RCoA), recognizes the packets as packets which are addressed to the mobile terminal MN that holds the binding cache BC, and then encapsulates the packets before transferring same to the care-of address (CoA) in accordance with the binding cache BC (step S9-2).

FIG. 4 shows an example of a path for position registration using path optimization and a packet transfer after position registration with respect to the position registration using the hierarchical mobile IPv6 and packet transfer after position registration shown in FIG. 3.

The mobile terminal MN judges whether path optimization should be implemented and, when path optimization is to be implemented, transfers position registration information to the correspondent node CN (S1-3). Thereupon, a regional care-of address (RCoA) is used as position information. Upon receipt of the position registration information from the mobile terminal MN, the correspondent node CN manages position information as binding cache BC (S2-3). The correspondent node CN sends back a position registration response by way of response to the position registration from the mobile terminal MN (step S3-3). This response is received by the mobile anchor point MAP and the mobile anchor point MAP transfers packets addressed to the mobile terminal MN that holds the binding cache BC to the binding cache BC (step S4-3).

Here, when transmitting packets to the mobile terminal MN, the correspondent node CN transmits the packets to a care-of address (CoA) in accordance with the binding cache BC (S5-3). The mobile anchor point MAP receives packets of the regional care-of address (RCoA) and recognizes the packets as packets which are addressed to the mobile terminal MN holding the binding cache BC. Thereafter, the packets are encapsulated and transferred to a care-of address (CoA) in accordance with the binding cache BC (S6-3).

Here, an example of the format of the position registration information transmitted from the mobile terminal MN to the home agent HA or correspondent node CN is as shown in FIG. 5. FIG. 5 is in IPv6 format and indicates only the header. The header portion has an IPv6 header I and an endpoint option header II. The IPv6 header I further comprises an origin IP address (I-1) and a transmission destination IP address (I-2).

The origin IP address (I-1) is a care-of address (CoA) which is an address on a movement destination link of the mobile terminal MN and is constituted by a network address and a host address. The transmission destination IP address (I-2) is the home address (HoA) of the home agent HA or the address of the correspondent node CN or the address of the mobile anchor point MAP.

The endpoint option header II comprises, as registration information, the flag II-1, the holding period of the registration information, that is, the valid time (life time) II-2 of the binding cache BC and the home address (HoA) II-3 which is an address on the home link of the mobile terminal MN. The home address (HoA) II-3 is a key when searching for the backup binding cache BC.

Figure 5A:
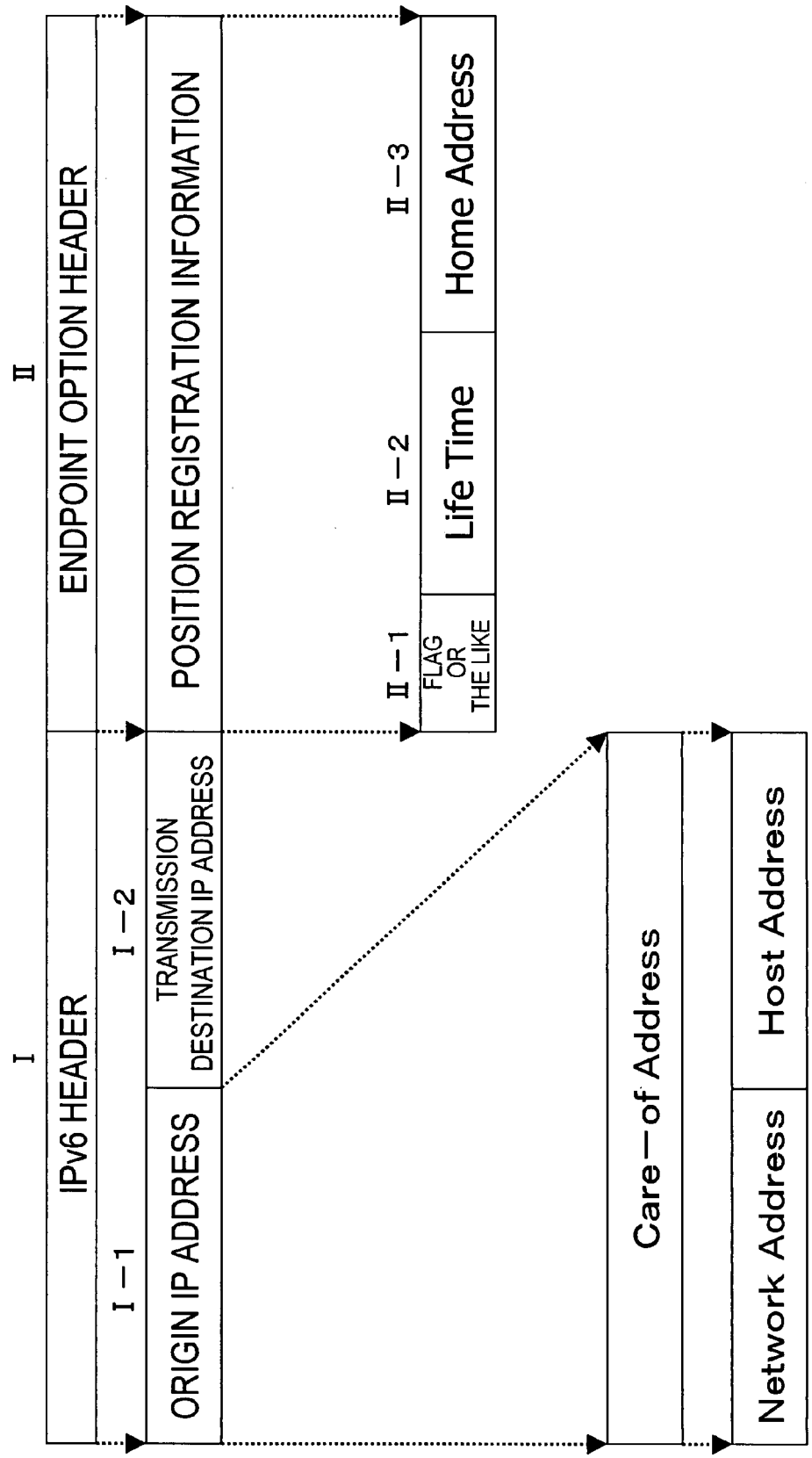
FIG. 5A shows only a header portion which is in the IPv6 format.
Figure 5B:
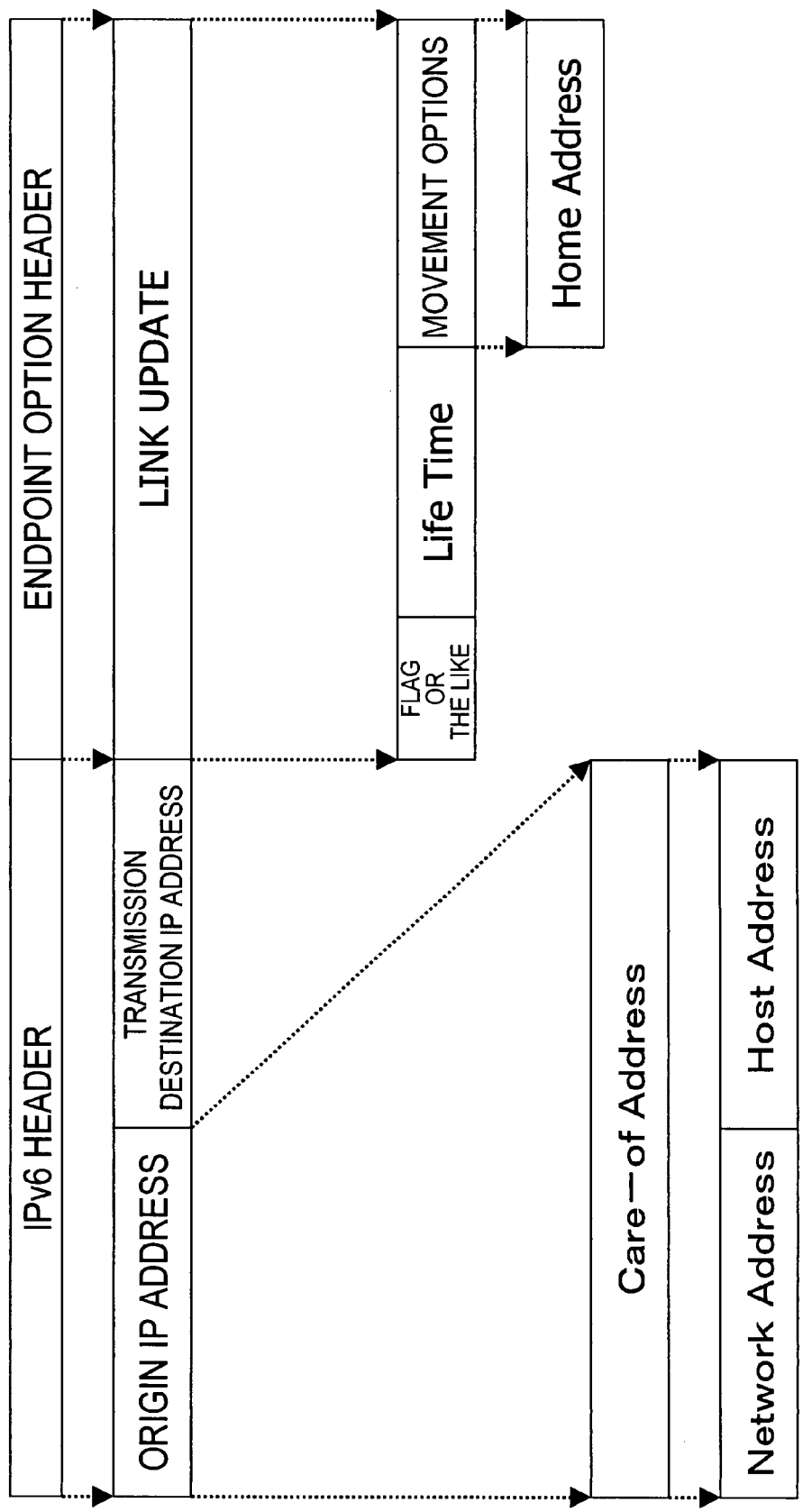
FIG. 5B shows the format of a 'position registration message'.

The 'position registration message' in FIG. 5B is a message for reporting position information on the movement destination to the node (HA/MAP/CN) that manages the position information of the mobile terminal MN. The link update is information on the binding cache.

Figure 5C:
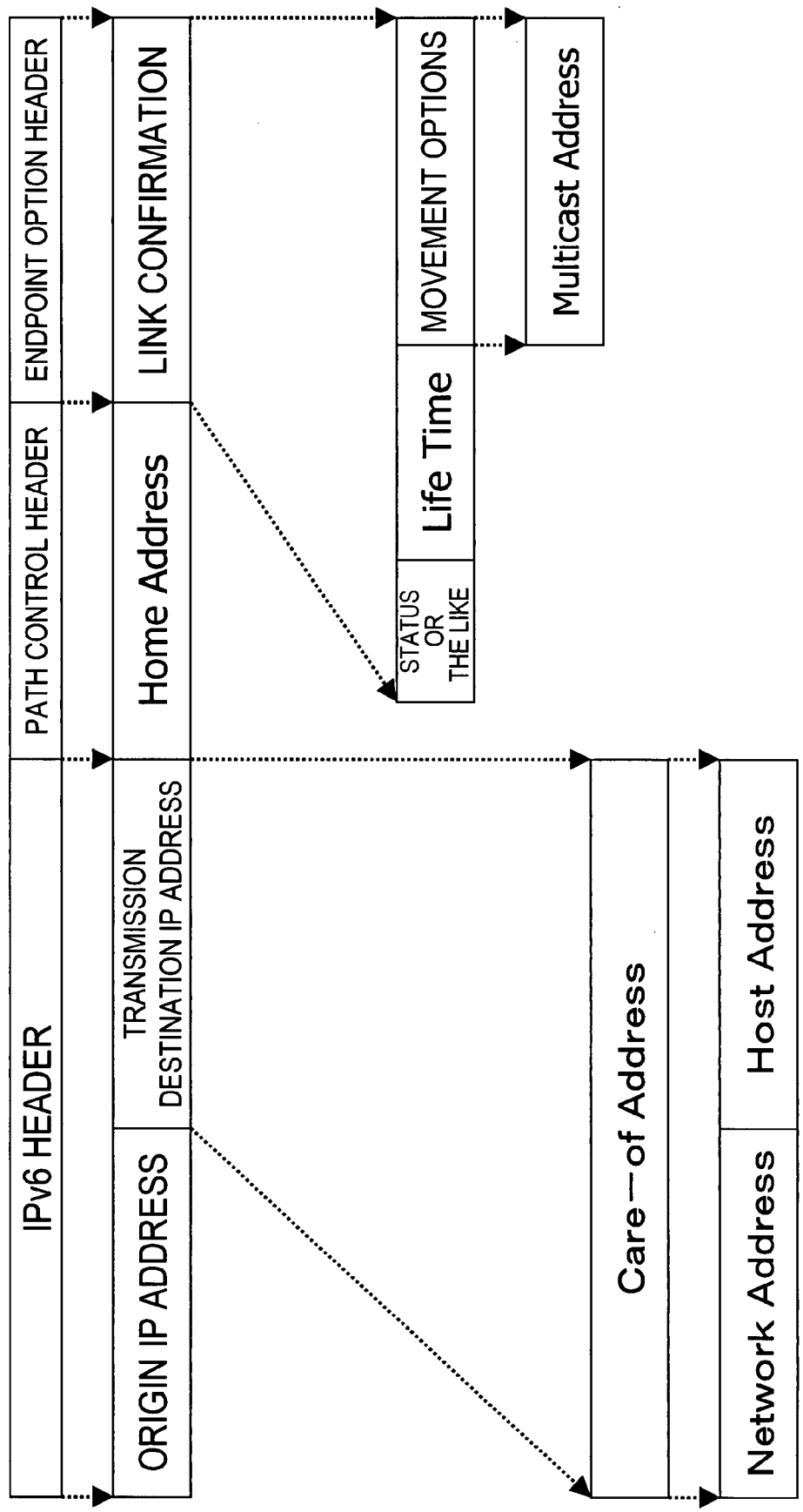
FIG. 5C shows the format of a 'position registration response message'.

The 'position registration response message' in FIG. 5C is a response message that the nodes for managing the position information (HA/MAP/CN) issue in response to the 'position registration message' from the mobile terminal MN. The 'multicast address' in the 'movement options' contained in the message is defined by the present invention and is reported by the nodes (HA/MAP/CN) that manage the position information to the mobile terminal MN.

Figure 5D:
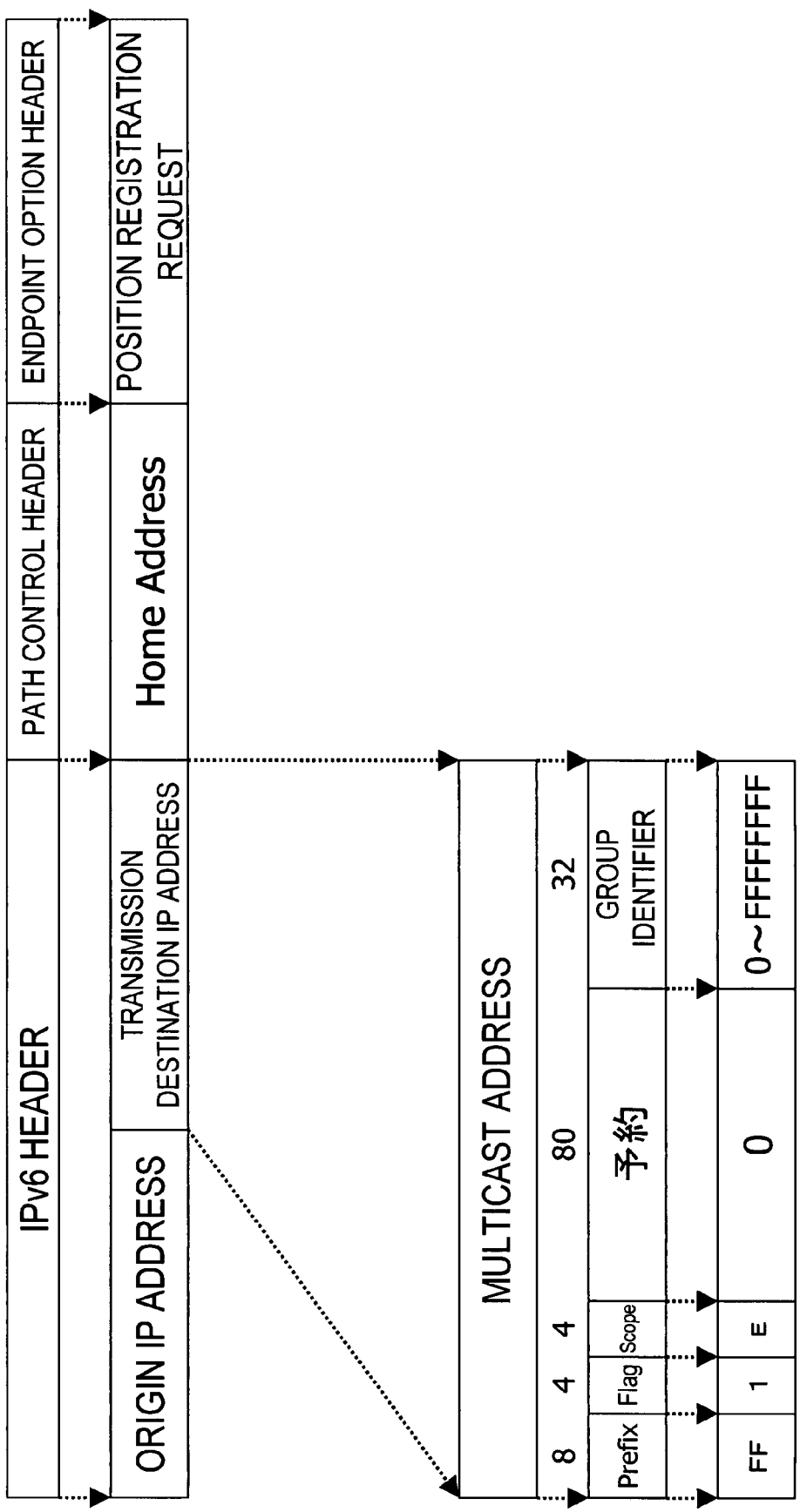
FIG. 5D shows the format of a 'position registration request message (multicast address destination)'.

The 'position registration request message (multicast address destination)' in FIG. 5D is a message to the nodes (HA/MAP/CN) that manage the position information to make a transmission to the mobile terminal MN with the objective of recovering the binding cache.

The 'multicast address' of the 'transmission destination IP address' is the 'multicast address' contained in the 'movement options' in FIG. 5C and the 'group identifier' is arbitrarily defined by the nodes (HA/MAP/CN) that manage the position information and reported to the mobile terminal MN.

Figure 5E:
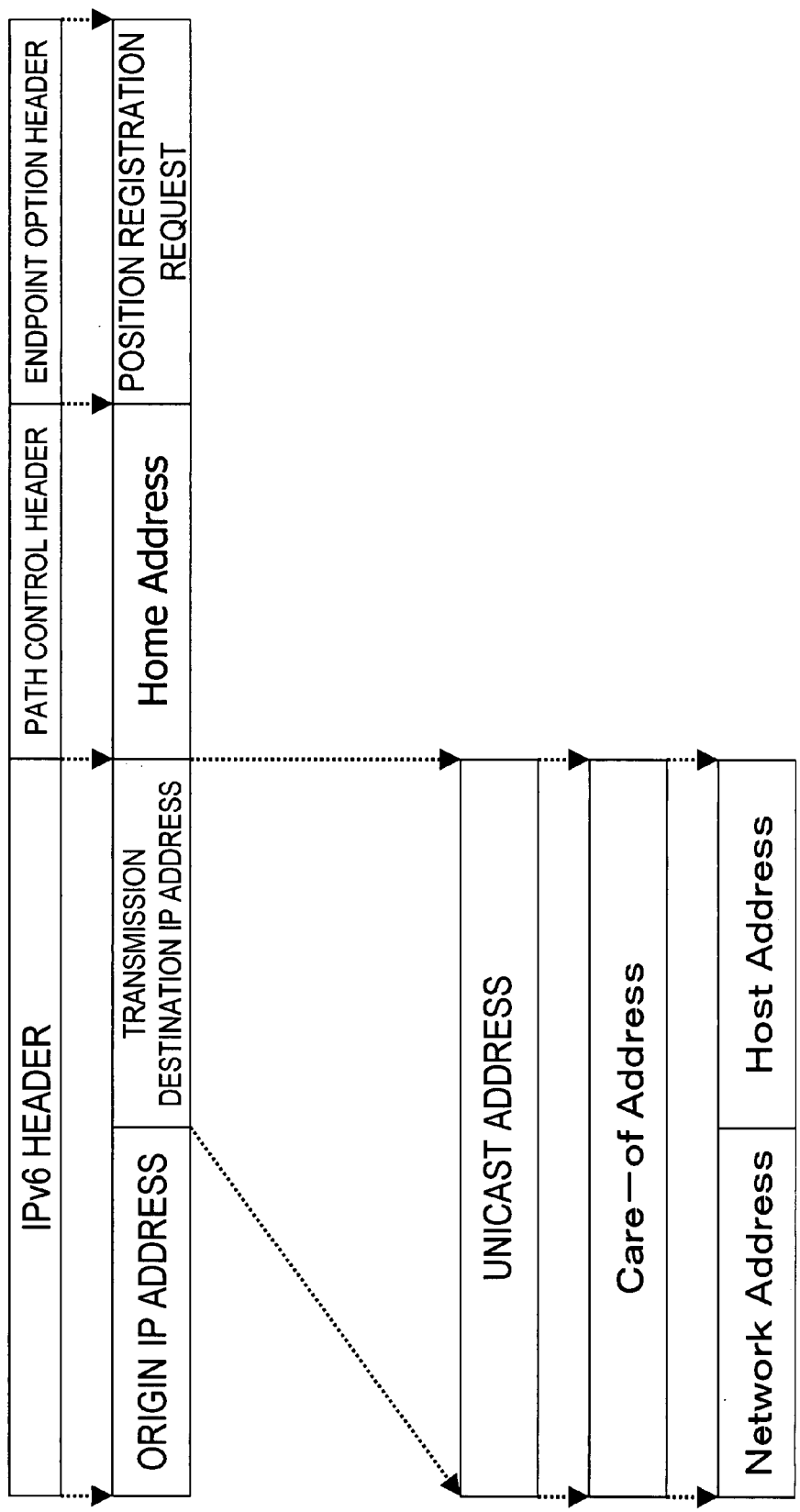
FIG. 5E shows the format of a 'position registration request message (unicast address destination)'.

The 'position registration request message (unicast address destination)' in FIG. 5E is a message that is transmitted when the nodes (HA/MAP/CN) that manage the position information have not been able to receive a 'position registration message' as a response from the MN with respect to the 'position registration request message (multicast address destination)'.

Here, as shown in FIGS. 1A to 4, in mobile IP (which includes mobile IPv6, hierarchical mobile IP, and hierarchical mobile IPv6), the home agent HA, correspondent node CN and mobile anchor point MAP allow the transfer of packets from the correspondent node CN to the mobile terminal MN by managing the position information reported by the mobile terminal MN as the binding cache BC.

Here, when a fault occurs in the respective nodes that hold the binding cache BC registered by the mobile terminal MN, even when the respective nodes are restored from their faulty state, the packet transfer from the correspondent node CN to the mobile terminal MN cannot be performed unless the binding cache BC thus held has been restored.

Normally, the restoration timing of the binding cache BC depends on a repositioning registration request using optional timing from the mobile terminal MN.

FIG. 6 shows an example of a case where a fault has occurred in the home agent HA in mobile IPv6.

Here, a fault occurs in the home agent HA and the binding cache BC being managed is annihilated, whereupon the home agent HA recovers from its fault (step S1-4). The correspondent node CN does not hold the binding cache BC for path optimization and, therefore, transmits packets to the home address (HoA) of the mobile terminal MN (step S2-4).

Because the binding cache BC has been annihilated in the home agent HA, packets addressed to the home address (HoA) of the mobile terminal MN cannot be transferred from the correspondent node CN to the movement destination of the mobile terminal MN (step S3-4).

FIG. 7 shows an example of a case where a fault occurs in the correspondent node CN in a path optimization registration example of mobile IPv6 shown in FIG. 2. Here, a fault occurs in the correspondent node CN, the managed binding cache BC is annihilated, and then the correspondent node CN is restored (step S1-5).

The correspondent node CN transmits packets to the home address (HoA) of the mobile terminal MN because the binding cache BC for path optimization has been annihilated (step S2-5). In FIG. 7, because the home agent HA transfers packets to the care-of address (CoA) of the mobile terminal MN (step S3-5), the packets from the correspondent node CN to the mobile terminal MN reach the mobile terminal MN but are in a state where the intended path optimization has not been implemented.

FIG. 8 shows an example where a fault occurs in the home agent HA in the hierarchical mobile IPv6 of FIG. 3. Here, the fault occurs in the home agent HA and the binding cache BC being maintained is annihilated, whereupon the home agent HA recovers from its fault (step S1-6).

Because the correspondent node CN is not holding the binding cache BC for path optimization, the correspondent node CN transmits packets to the home address (HoA) of the mobile terminal MN (S2-6).

The binding cache BC has been annihilated in the home agent HA and, therefore, packets addressed to the home address (HoA) of the mobile terminal MN are not transferred from the correspondent node CN to the movement destination of the mobile terminal MN (S3-6).

FIG. 9 shows an example of a case where a fault occurs in the mobile anchor point MAP in the hierarchical mobile IPv6 of FIG. 3. In this example, the correspondent node CN is not holding the binding cache BC for path optimization.

Here, a fault occurs in the mobile anchor point MAP, the binding cache BC being managed is annihilated and then the mobile anchor point MAP recovers from its fault (step S1-7).

The correspondent node CN is not holding the binding cache BC for path optimization and, therefore, packets are transmitted to the home address (HoA) of the mobile terminal MN (step S2-7).

The home agent HA encapsulates and transfers packets addressed to the home address (HoA) of the mobile terminal MN to the care-of address (CoA) in accordance with the binding cache BC (step S3-7).

However, because the binding cache BC has been annihilated in the mobile anchor point MAP, the packets transmitted from the home agent HA cannot be transferred to the movement destination of the mobile terminal MN (step S4-7).

Figure 10:
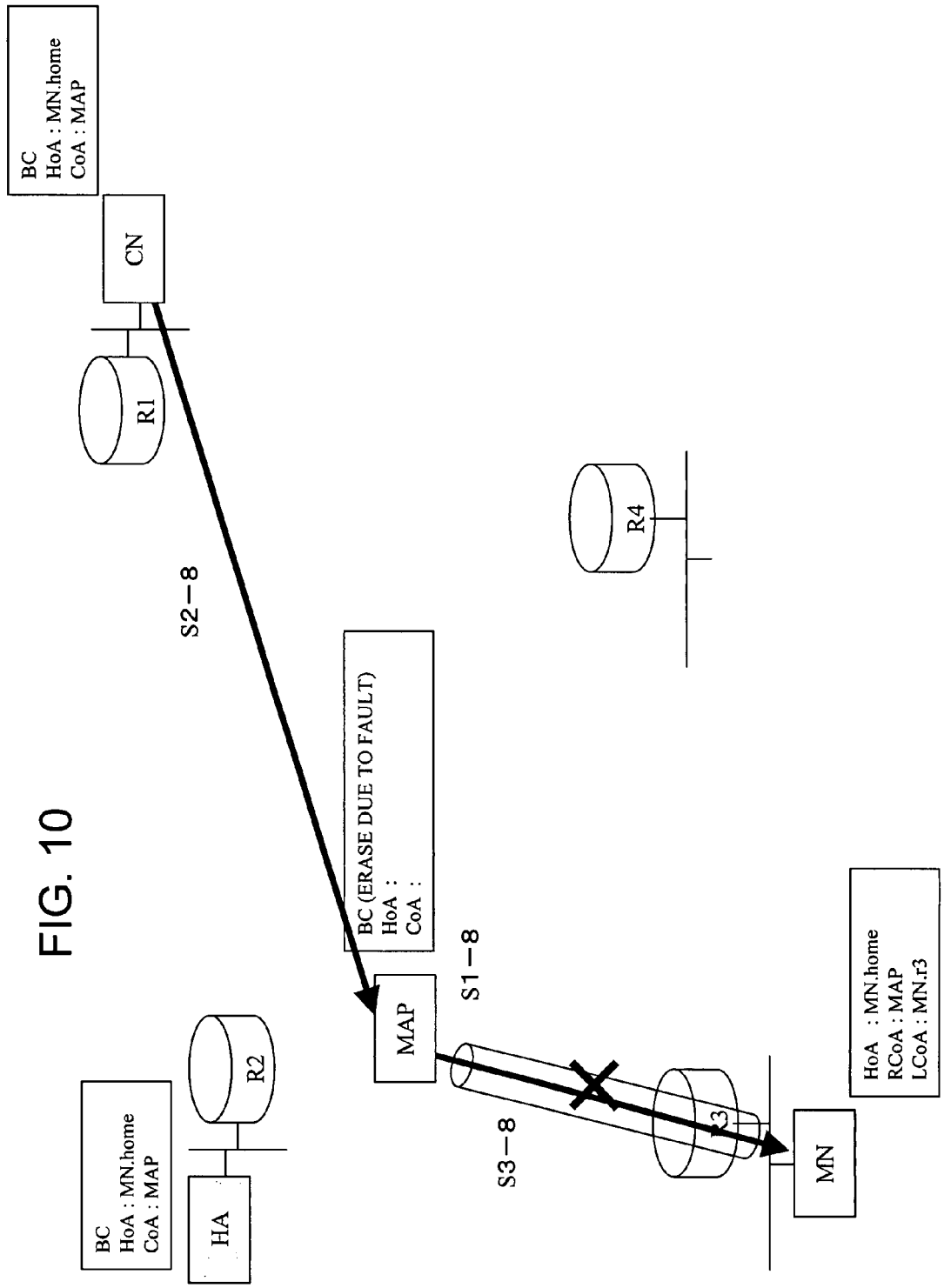
FIG. 10 shows an example of a case where a fault has occurred in the mobile anchor point MAP in the hierarchical mobile IPv6 in the path optimization of FIG. 4.

FIG. 10 shows an example of a case where a fault occurs in the mobile anchor point MAP in hierarchical mobile IPv6 in the path optimization of FIG. 4. In this example, the correspondent node CN is holding the binding cache BC for path optimization.

Here, a fault arises in the mobile anchor point MAP and the binding cache BC being managed is annihilated, whereupon the mobile anchor point MAP recovers from its fault (S1-8).

The correspondent node CN is holding the binding cache BC for path optimization and, therefore, packets are transmitted to a care-of address (CoA) in accordance with binding cache BC (S2-8).

The binding cache BC has been annihilated in the mobile anchor point MAP and, therefore, packets transmitted from the correspondent node CN cannot be transferred to the movement destination of the mobile terminal MN (S3-8).

As shown in FIGS. 6 to 10, when a fault occurs in each node holding the binding cache BC, the packets addressed to the mobile terminal from the correspondent node CN do not arrive or arrive via an unintended (that is, non-optimal) path.

Furthermore, the timing of the restoration of the binding cache BC depends on a repositioning registration request with optional timing from the mobile terminal MN.

Figure 11:
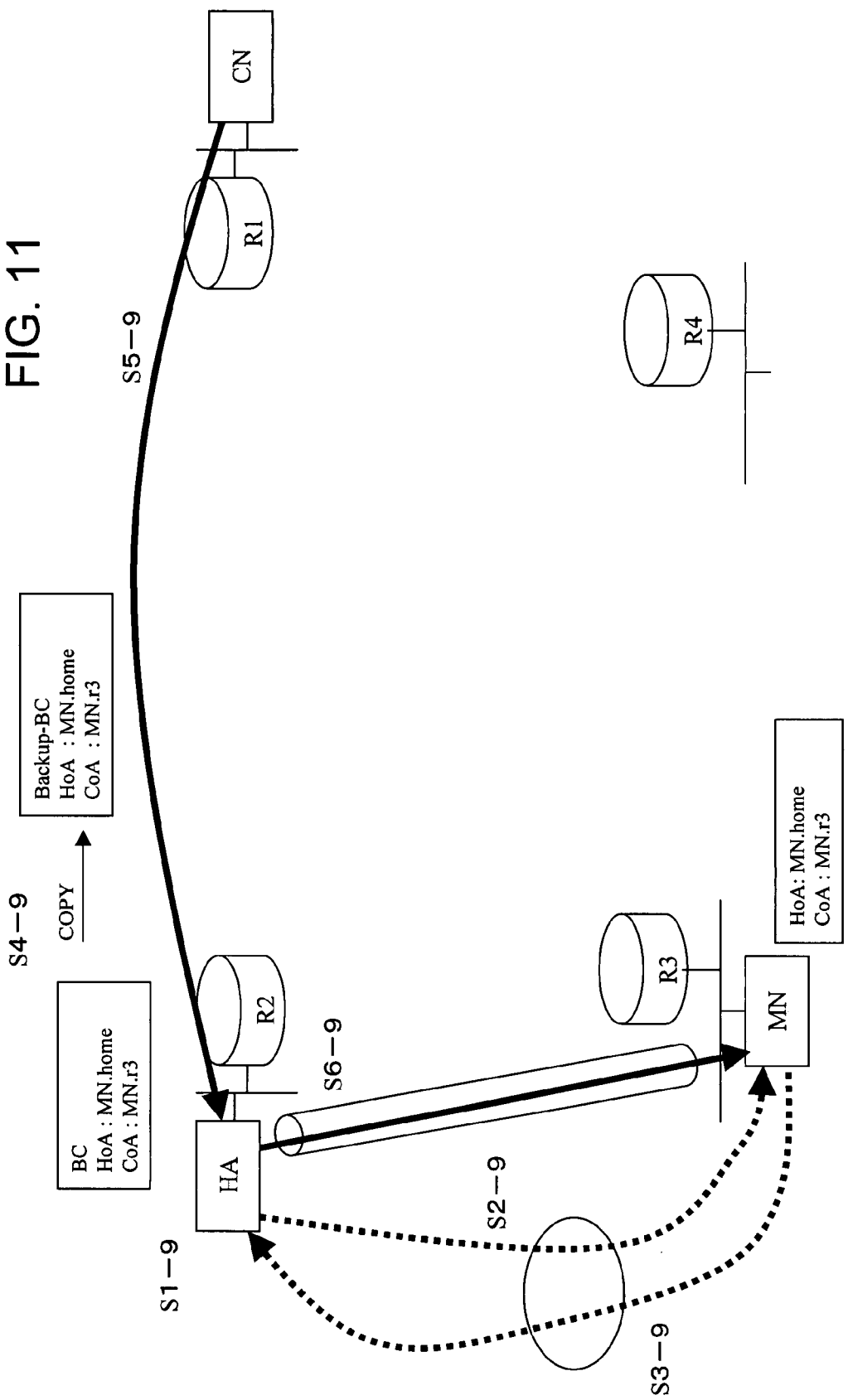
FIG. 11 illustrates the restoration procedure formerly proposed by the present inventor.

The present inventor first proposed the restoration procedure shown in FIG. 11 for the sake of eliminating this inconvenience (Japanese Application Laid Open No. 2004-96193). That is, the aspect shown in FIG. 11 is characterized by a procedure in which the home agent HA copies the binding cache BC from the mobile terminal MN to the backup binding cache BC in the mobile IPv6 corresponding with FIG. 1A.

Here, a fault occurs in the home agent and the binding cache BC which is being managed is annihilated, whereupon the home agent HA recovers from its fault (step S1-9). When the home agent HA has been restored, the backup binding cache BC that is normally saved is retrieved and, when the position information has been stored, transmits the position registration request to the mobile terminal MN (step S2-9).

The mobile terminal MN transmits a position registration to the home agent HA when the position registration request from the home agent HA is received (step S3-9).

When the position registration from the mobile terminal MN is received, the home agent HA starts to maintain the position information and overwrites and copies the position information to the backup binding cache BC (step S4-9).

The correspondent node CN transmits packets to the HoA of the mobile terminal MN (step S5-9). Because the binding cache BC has been recovered in the home agent HA, packets addressed to the HoA of the mobile terminal MN are transferred in accordance with the BC (step S6-9).

Here, in the recovery system shown in FIG. 10, when a multiplicity of position information is stored in the backup binding cache BC, position registration requests are continuously transmitted in large quantities from the home agent HA immediately following the reinstatement thereof after the fault (step S2-9). Further, because MN transmits the position registration by way of response to the position registration request (step S3-9), the home agent HA receives a large quantity of position registrations. Due to the processing of these steps S2-9 and S3-9, congestion occurs in the home agent HA and a fault can also be induced.

Therefore, the present invention also provides a system for performing recovery of the binding cache BC by avoiding congestion during fault restoration in the respective nodes, namely, the home agent HA, correspondent node CN, and mobile anchor point MAP. Further, an overview of the constitution is as follows:

Upon receiving position registrations from mobile terminal MN, the home agent HA, correspondent node CN, and mobile anchor point MAP create a copy of the binding cache BC (backup binding cache BC) and manage this copy. As a result, it is possible to acquire the binding cache BC that was held prior to the occurrence of a fault.

In order to confirm that the acquired binding cache BC is valid, the home agent HA, correspondent node CN, and mobile anchor point MAP issue a position registration request to the mobile terminal MN that is stored in the binding cache BC.

Thereupon, in order to avoid the congestion of the faulty node which is a problem that lies with the system illustrated by the previous Japanese Application Laid Open No. 2004-96193, it is a characteristic of the present invention to designate a multicast address that is reported to the mobile terminal MN beforehand as the destination of the packet requesting position registration.

When the mobile terminal MN has sent back a position registration in response to the position registration request to the multicast address, the binding cache BC is recognized as being valid and managed. When the mobile terminal MN does not send back a position registration in response to the position registration request to the multicast address, because a router that does not support multicasts may also exist, when a position registration request to the unicast address of the mobile terminal MN is transmitted and the mobile terminal MN has sent back a position registration, the binding cache BC is recognized as being valid and managed.

When the mobile terminal MN has not sent back a position registration in response to the position registration request to a multicast/unicast address, the binding cache BC is recognized as being defective and erased.

Figure 12:
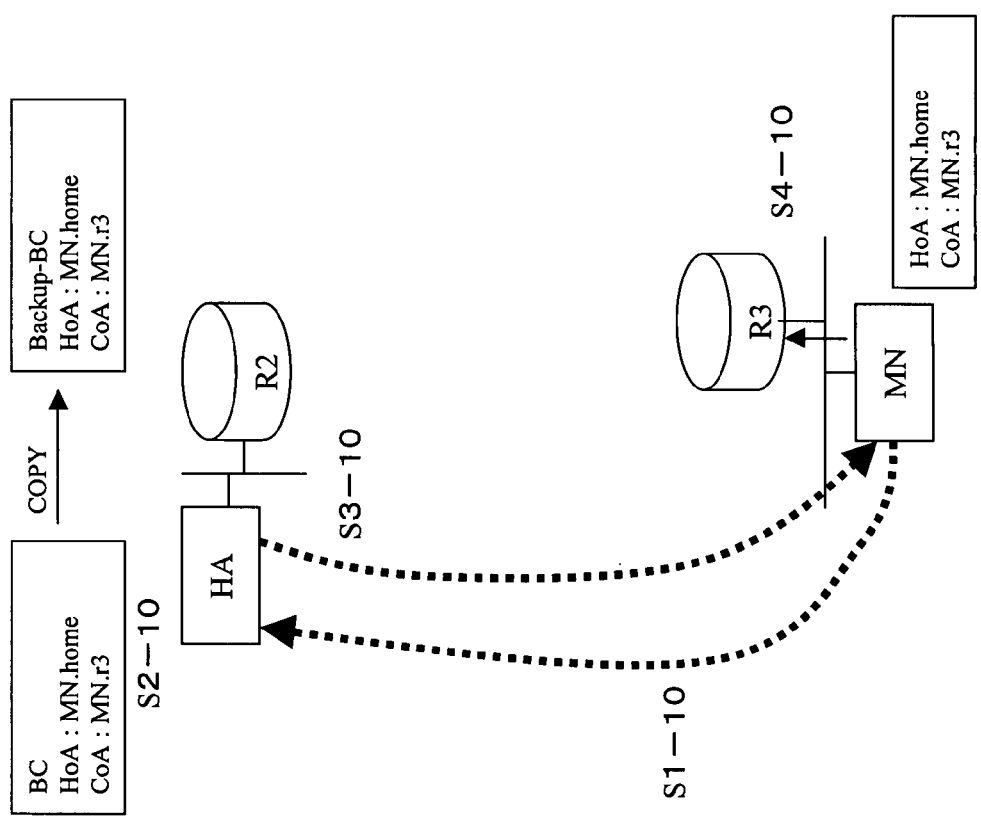
FIG. 12 shows a first method of recovering the binding cache of the home agent HA of MIPv6 according to the present invention.

FIG. 12 shows a first method of recovering the binding cache of the home agent HA of MIPv6 according to the present invention.

FIG. 12 shows a procedure whereby the home agent HA copies the binding cache BC from the mobile terminal MN to a backup binding cache BC in MIPv6 and a procedure whereby a multicast address is reported by the home agent HA to the mobile terminal MN.

When the mobile terminal MN has moved, the mobile terminal MN obtains a unicast address CoA of an external Link and transmits a position registration to the home agent HA (step S1-10).

Upon receipt of the position registration from the mobile terminal MN, the home agent HA manages the position information from the mobile terminal MN as the binding cache BC. Thereupon, the binding cache BC is copied as the backup binding cache BC (step S2-10).

The home agent HA sends back a position registration response by way of response to the position registration from the mobile terminal MN. Here, the response contains a multicast address (step S3-10). When a multicast address exists when the mobile terminal MN receives a position registration response from the home agent HA, the mobile terminal MN performs registration of a Multicast Group Identifier (GRP-ID) by using the Multicast Listener Report of the Internet Group Management Protocol (IGMP) with respect to a neighboring router (step S4-10).

Here, if necessary, a Multicast Listener Report is transmitted by way of response to the Multicast Listener Query from the multicast router.

Router R3, which is a router in the vicinity of the mobile terminal MN, registers a group identifier (GRP-ID) as a multicast router and establishes a path with R2, which is a multicast router, in accordance with an optional protocol between multicast routers.

Figure 13:
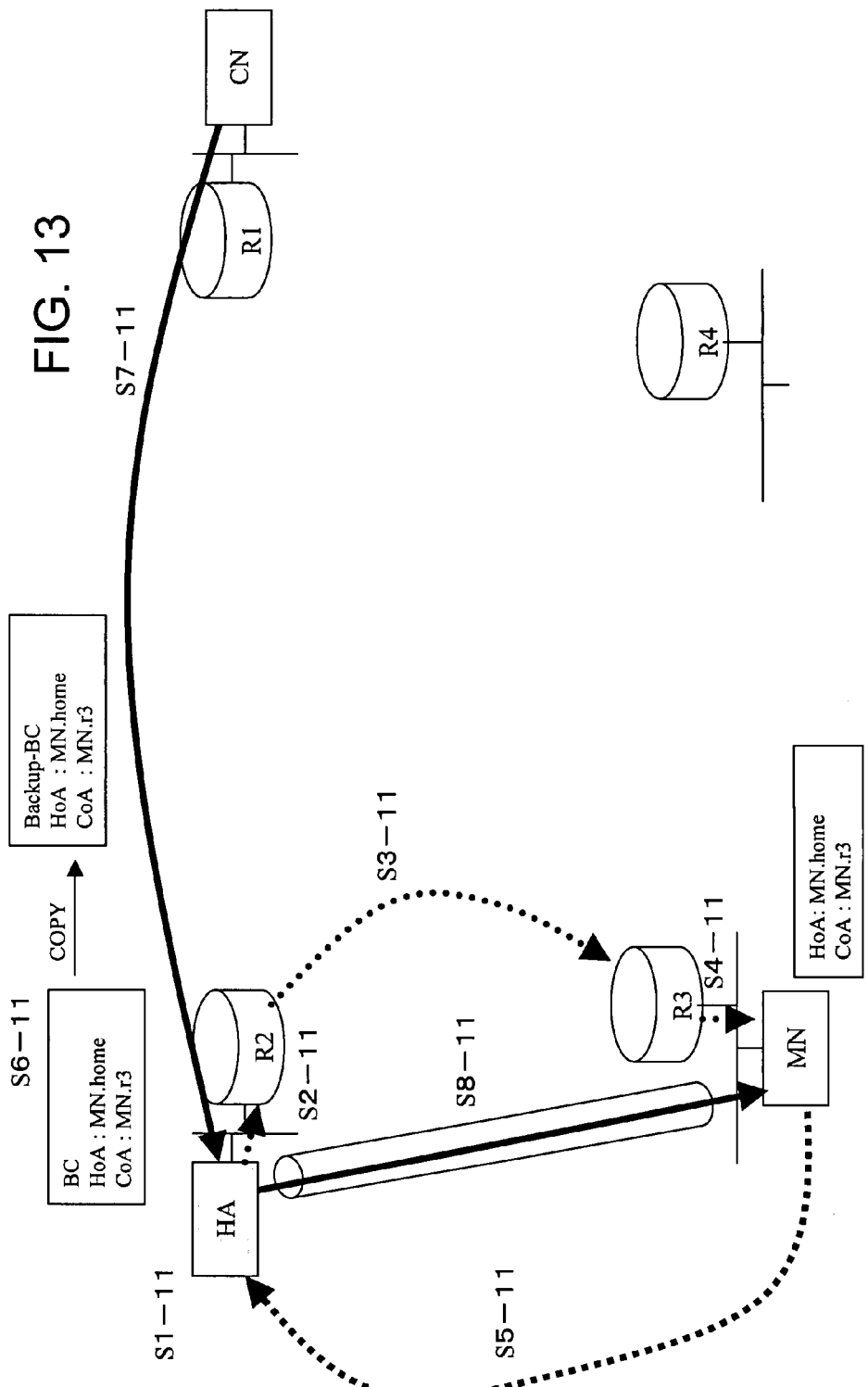
FIG. 13 shows a second method of recovering the binding cache of the home agent HA of MIPv6 according to the present invention.

FIG. 13 shows a second method of recovering the binding cache of the home agent HA of MIPv6 according to the present invention.

FIG. 13 shows a procedure in which, when a fault has occurred in the home agent HA in MIPv6, the home agent HA recovers from its fault and checks the validity of the binding cache BC, and starts maintenance upon recognizing the binding cache BC as being valid.

When a fault occurs in the home agent HA (step S1-11) and the fault is then restored and the home agent HA is reactivated, a search to determine whether position information is stored in the backup binding cache BC is performed and, when just one information item is stored therein, a position registration request is transmitted to the multicast address of the mobile terminal MN (step S2-11).

Subsequently, router R2 transfers a position registration request from the home agent HA to the multicast address in accordance with the multicast transfer rules (step S3-11).

Router R3 transfers a position registration request from the home agent HA to the multicast address in accordance with the multicast transfer rules (step S4-11). When the position registration request from the home agent HA is received, the mobile terminal MN transmits a position registration to the home agent HA (step S5-11).

Upon receiving the position information from the mobile terminal MN, the home agent HA starts to maintain the position information. Thereupon, the home agent HA makes a copy to the backup binding cache BC (step S6-11).

The correspondent node CN transmits packets to the home address (HoA) of the mobile terminal MN (step S7-11). Because the binding cache BC has been restored in the home agent HA, packets addressed to the home address (HoA) of the mobile terminal MN are transferred thereto in accordance with the binding cache BC (step S8-11).

Figure 14:
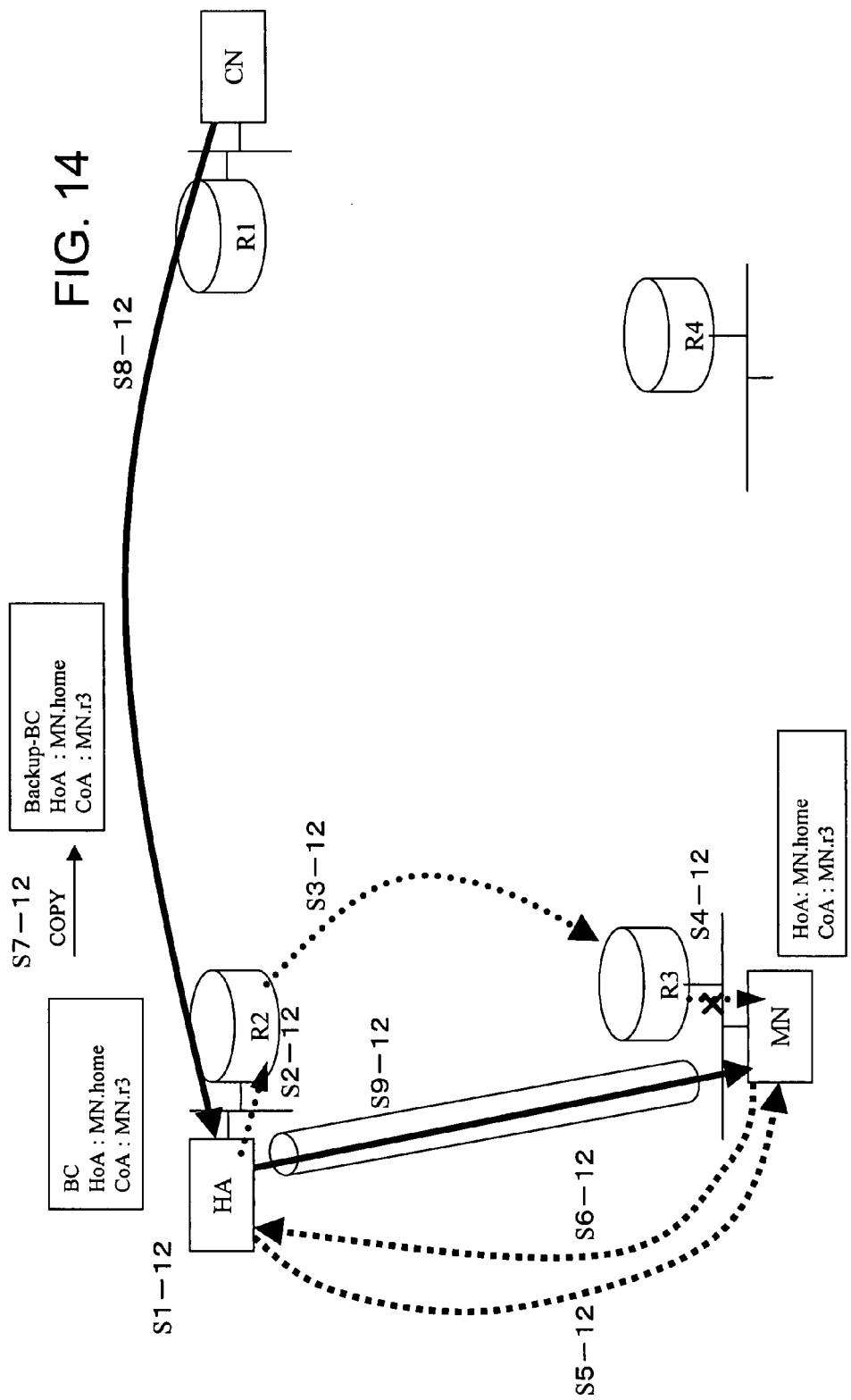
FIG. 14 shows a third method of recovering the binding cache of the home agent HA of MIPv6 according to the present invention.

FIG. 14 shows a third method of recovering the binding cache of the home agent HA of MIPv6 according to the present invention.

FIG. 14 shows a procedure in which, when a fault has occurred in the home agent HA in MIPv6, the home agent HA recovers from its fault and checks the validity of the binding cache BC, and starts maintenance upon recognizing the binding cache BC as being valid.

The difference from FIG. 13 consists in the fact that, when the router R3 which is the router which neighbors the mobile terminal MN does not support multicasts, the home agent HA resends the position registration request to the unicast address.

Steps S1-12 to S3-12 are the same as S1-11 to S3-11 in FIG. 13.

When the router R3 does not support multicasts, because a position registration request from the home agent HA to the multicast address cannot be transferred, the position registration request does not arrive at the mobile terminal MN (step S4-12).

When a response has not been sent back to the position registration request addressed to the multicast address, the home agent HA transmits a position registration request to a unicast address (CoA) that is stored in the backup binding cache BC (step S5-12).

Upon receiving the position registration request from the home agent HA, the mobile terminal MN transmits a position registration to the home agent HA (step S6-12).

Upon receiving the position information from the mobile terminal MN, the home agent HA starts to maintain the position information. Thereupon, the home agent HA copies the position information to the backup binding cache BC (step S7-12).

The correspondent node CN transmits packets to the home address HoA of the mobile terminal MN (step S8-12). Because the binding cache BC has been restored in the home agent HA, packets addressed to the home address HoA of the mobile terminal MN are transferred in accordance with the binding cache BC (step S9-12).

Figure 15:
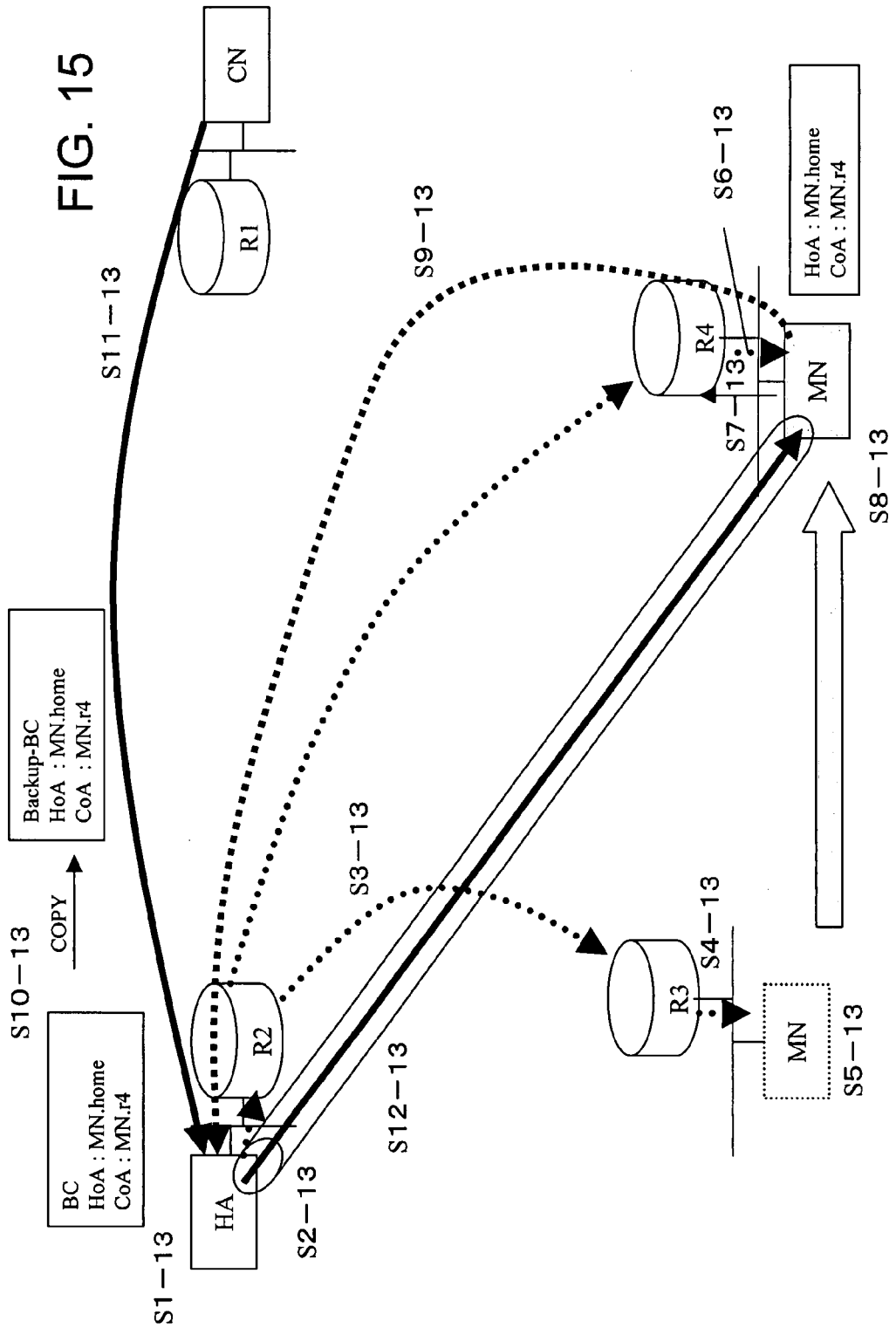
FIG. 15 shows a fourth method of recovering the binding cache of the home agent HA of MIPv6 according to the present invention.

FIG. 15 shows a fourth method of the binding cache recovery of the home agent HA of MIPv6 according to the present invention.

FIG. 15 shows a procedure in which, when a fault has occurred in the home agent HA in MIPv6, the home agent HA recovers from its fault and checks the validity of the binding cache BC, and starts maintenance upon recognizing the binding cache BC as being valid.

The difference from FIGS. 13 and 14 consists in the fact that, although the mobile terminal MN moves to another link before the home agent HA is restored, registration of the multicast group identifier GRP-ID is performed by using the IGMP multicast listener report in router R4 which is the neighboring router. Hence, this fourth method is characterized in that the position registration request from the home agent HA to the multicast address arrives and recovery of the binding cache BC can be performed normally.

S1-13 to S4-13 are the same as S1-12 to S4-12 in FIG. 14.

The mobile terminal MN moves to another link belonging to router R4 before the home agent HA is restored and is therefore unable to receive the position registration request from the home agent HA (step S5-13).

After moving, the mobile terminal MN registers the GRP-ID of the multicast group identifier GRP-ID by using the IGMP multicast listener report in neighboring router R4 (step S6-13). Thereupon, if necessary, a multicast listener report is transmitted by way of response to the multicast listener query from the multicast router.

The neighboring router R4 registers the group identifier GRP-ID as a multicast router and creates a path to the router R2 which is a multicast router in accordance an optional protocol between multicast routers.

Router R4 transfers a position registration request from the home agent HA to the multicast address in accordance with the multicast transfer rules (step S7-13). The mobile terminal MN does not perform position registration with respect to the home agent HA after moving and, therefore, the position registration request from the home agent HA does not normally arrive. However, when the mobile terminal MN completes registration of the multicast group identifier GRP-ID by using the IGMP multicast listener report with respect to the neighboring router R4 after moving, the position registration request from the home agent HA is received (step S8-13).

When the position registration request from the home agent HA is received, the mobile terminal MN transmits the position registration to the home agent HA (step S9-13). Upon receiving the position information from the mobile terminal MN, the home agent HA starts to maintain the position information. Thereupon, a copy is made to the backup binding cache BC (step S10-13).

The correspondent node CN transmits packets to the home address (HoA) of the mobile terminal MN (step S11-13). Because the binding cache BC has been restored in the home agent HA, packets addressed to the home address (HoA) of the mobile terminal MN are transferred in accordance with the binding cache BC (step S12-13).

Figure 16:
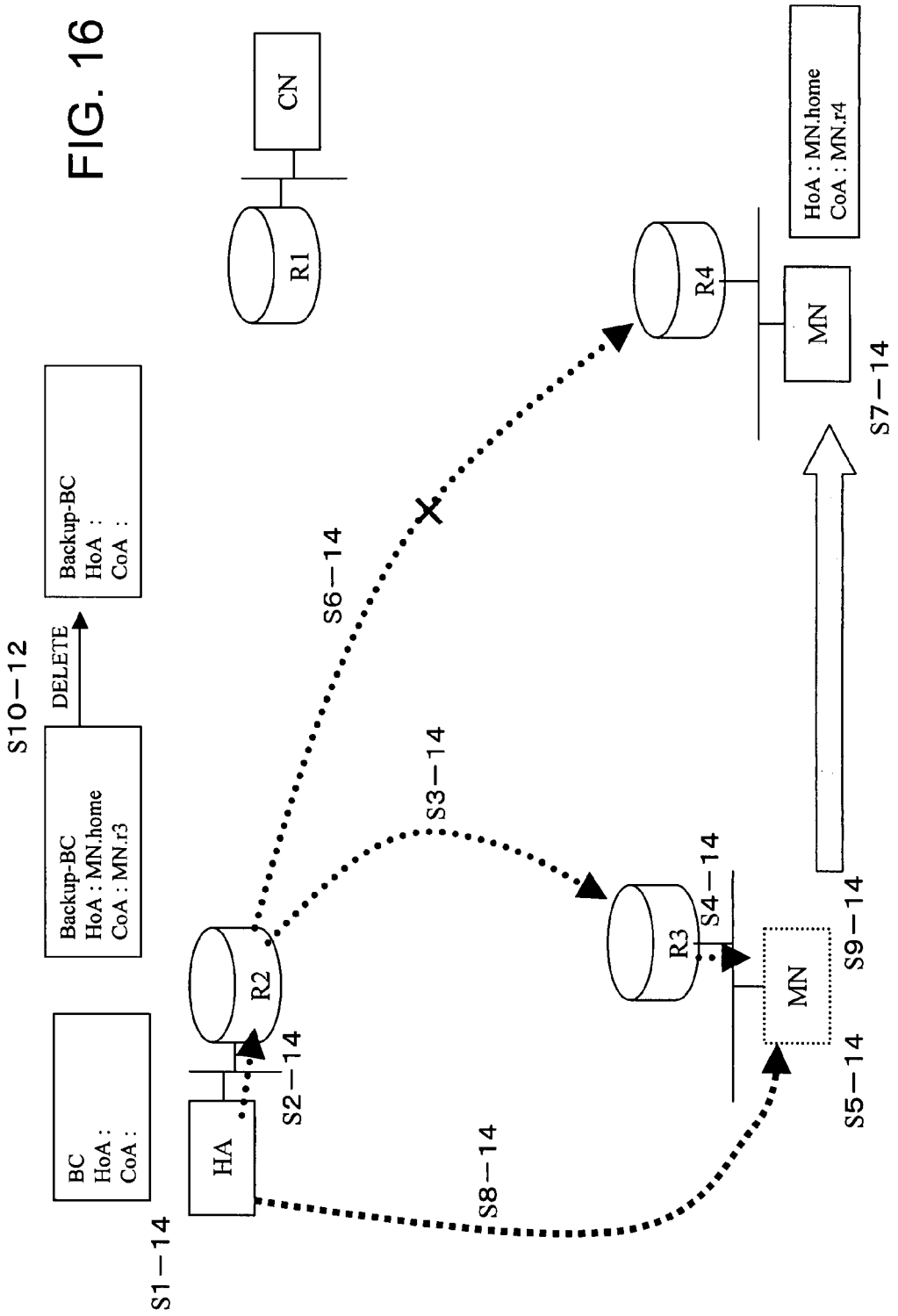
FIG. 16 shows a fifth method of recovering the binding cache of the home agent HA of MIPv6 according to the present invention.

FIG. 16 shows a fifth method for the binding cache recovery of the home agent HA of MIPv6 in accordance with the present invention.

FIG. 16 shows a procedure in which, when there is a fault with the HA in MIPv6, the HA recovers from its fault and recognizes the binding cache BC as being invalid as a result of checking the validity of the binding cache BC and erases the position information of the backup binding cache BBC.

S1-14 to S5-14 are the same as S1-13 to S5-13 in FIG. 14.

In S6-14, router R2 was unable to establish a path for a packet transfer to the multicast address to neighboring router R4 which is the movement destination of the mobile terminal MN. Hence, packets from the HA to the multicast address are not transferred.

Because a path for a packet transfer to the multicast address could not be established between R2 and R3, the position registration request from the home agent HA to the multicast address does not arrive at the mobile terminal MN (step S7-14).

When a response with respect to the position registration request to the multicast address is not sent back, the home agent HA transmits the position registration request to the unicast address (CoA) stored in the backup binding cache BBC (step S8-14).

The mobile terminal MN moves to another link before the home agent HA is reactivated and, therefore, the position registration request to the unicast address does not arrive at mobile terminal MN and is not received thereby (step S9-14).

Thereafter, when there is no response to the position registration request transmitted to the mobile terminal MN, the home agent HA recognizes that the position information stored in the backup binding cache BBC is invalid and erases the position information in the backup binding cache BBC (step S10-14).

The mobile terminal MN is unable to receive the position registration request from the home agent HA in the following cases:

The mobile terminal MN does not transmit an IGMP Multicast Listener Report to the neighboring router after moving;

The mobile terminal MN transmits an IGMP Multicast Listener Report to the neighboring router after moving but the neighboring router is not a multicast router; and The mobile terminal MN transmits an IGMP Multicast Listener Report to the neighboring router after moving but the creation of a path from the neighboring router of the home agent HA to the neighboring router of the mobile terminal MN by the multicast router is not completed until the home agent HA transmits a multicast address position registration request.

When the mobile terminal MN has not been able to receive a position registration request by the above route, because the position registration request is transmitted from the home agent HA to the unicast address (CoA:MN.r3) but is transmitted to the a CoA under router R3, the position registration request does not arrive at the mobile terminal MN that has moved to work under router R4, the home agent HA erases the binding cache BC.

FIGS. 17 to 21 show examples of the recovery operation of the binding cache BC of the correspondent node CN in MIPv6.

Figure 17:
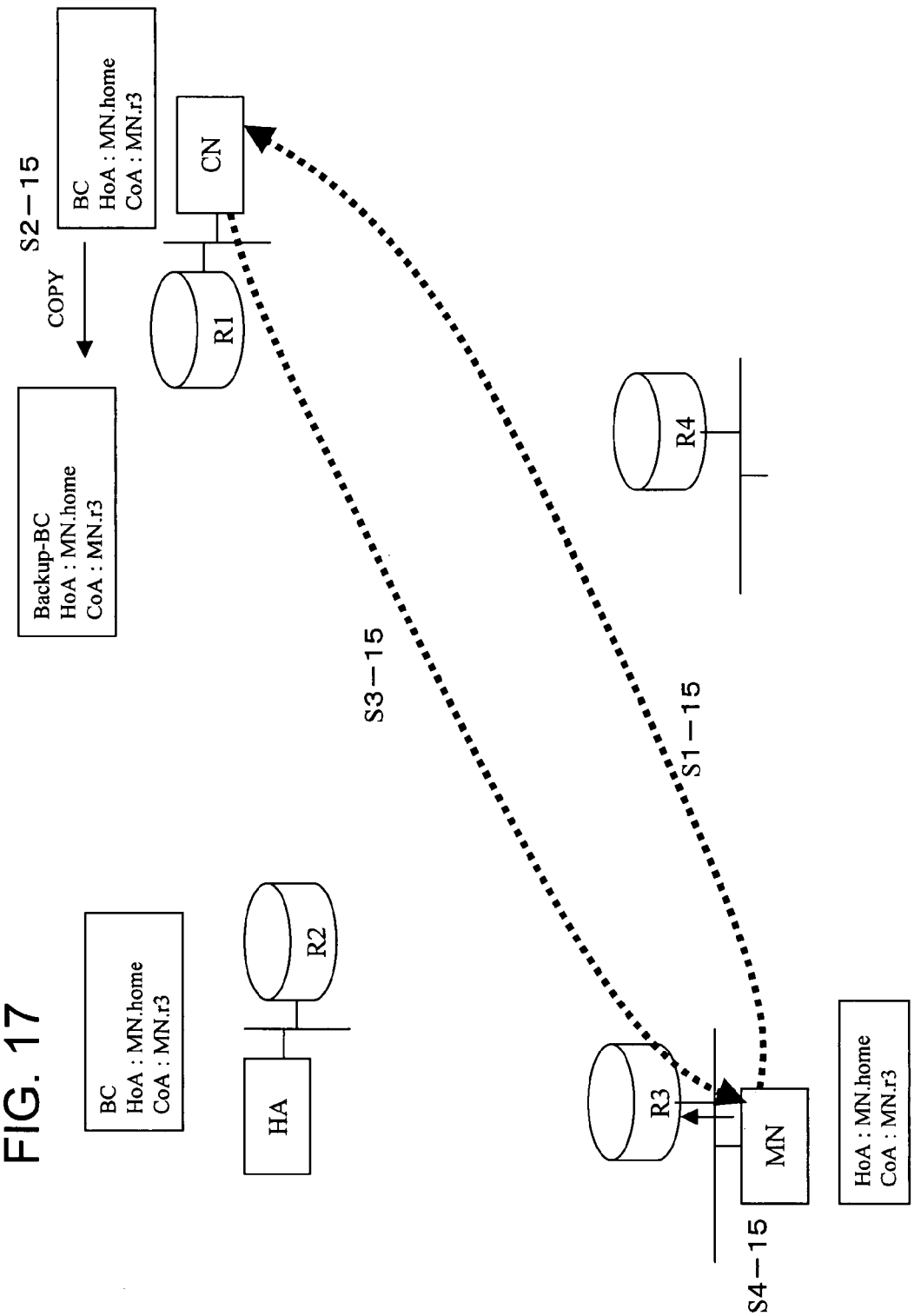
FIG. 17 shows a first method of recovering the binding cache of the correspondent node CN of MIPv6 according to the present invention.

FIG. 17 shows a first method of recovering the binding cache of the correspondent node CN of MIPv6 according to the present invention.

The example shown in FIG. 17 illustrates the procedure for copying position information to the backup binding cache BBC and registering a multicast address. In FIG. 17, the mobile terminal MN transmits a position registration to the correspondent node CN for the sake of path optimization (step S1-15).

Upon receiving the position registration from the mobile terminal MN, the correspondent node CN maintains the position information of the mobile terminal MN as the binding cache BC (step S2-15). Here, the binding cache BC is copied to the backup binding cache BBC.

The correspondent node CN sends back a registration response by way of response to the position registration from the mobile terminal MN.

Here, the response contains a multicast address (step S3-15). The mobile terminal MN registers a multicast group ID with respect to the neighboring router when a multicast address exists when the registration response from the home agent HA is received (step S4-15).

Figure 18:
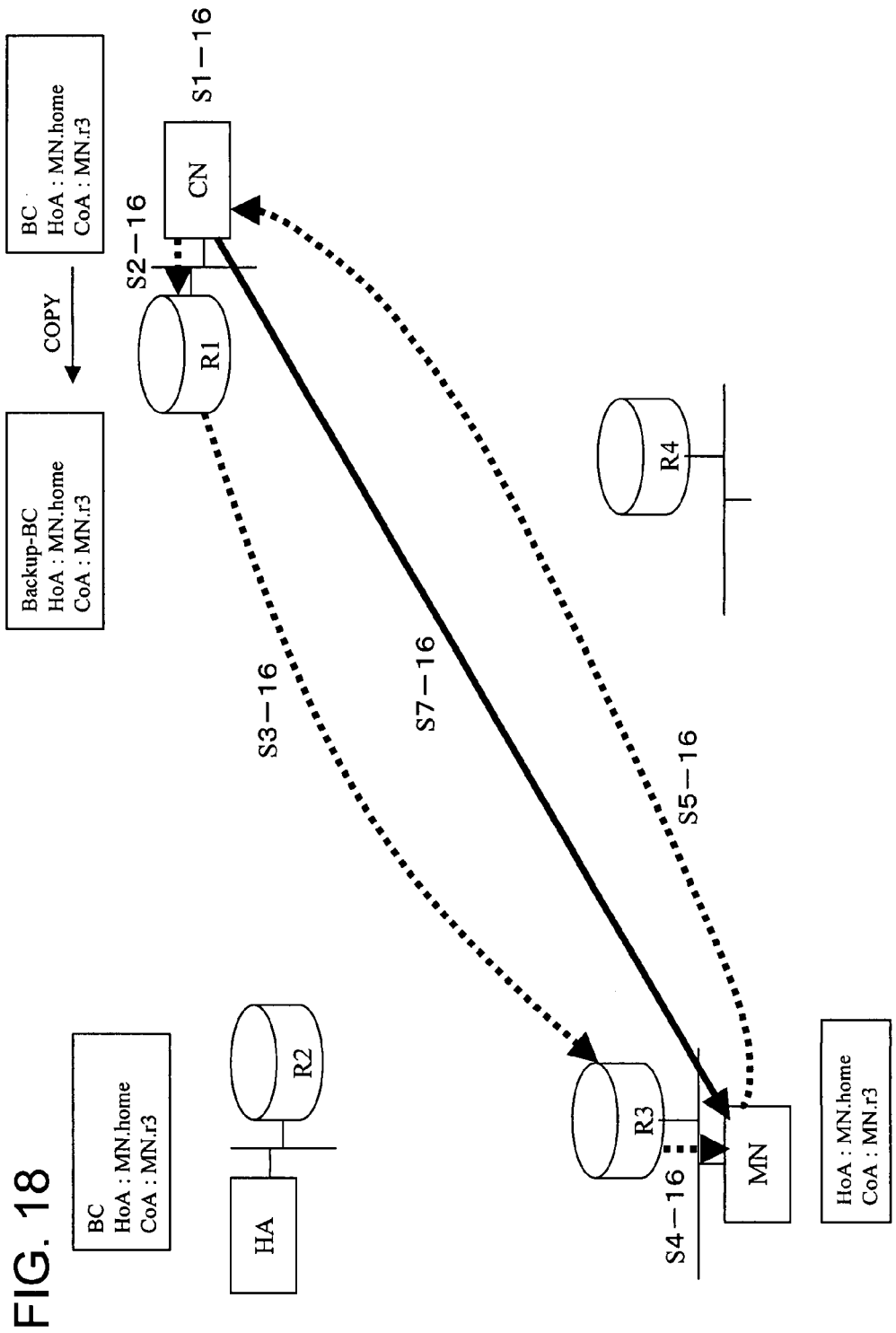
FIG. 18 shows a second method of recovering the binding cache of the correspondent node CN of MIPv6 according to the present invention.

FIG. 18 shows a second method of recovering the binding cache of the correspondent node CN of MIPv6 according to the present invention and illustrates a first procedural method of making the position information of the backup binding cache BBC valid.

In FIG. 18, when a fault occurs in the correspondent node CN (step S1-16) and the correspondent node CN is activated, a search is performed to determine whether position information is stored in the backup binding cache BBC and, if stored, a position registration request is transmitted to the multicast address of the mobile terminal (step S2-16).

Router R1 transfers a position registration request addressed to the multicast address in accordance with the multicast transfer rules (step S3-16). Router R3 transfers the position registration request addressed to the multicast address in accordance with the multicast transfer rules (step S4-16).

The mobile terminal MN transmits position information when a position registration request is received from the correspondent node CN (step S5-16). The correspondent node CN starts to maintain the position information when the position information from the mobile terminal MN is received and copies the binding cache BC to the backup binding cache BBC (step S6-16).

The correspondent node CN transmits packets addressed to the mobile terminal MN that holds the binding cache BC in accordance with the binding cache BC (step S7-16).

Figure 19:
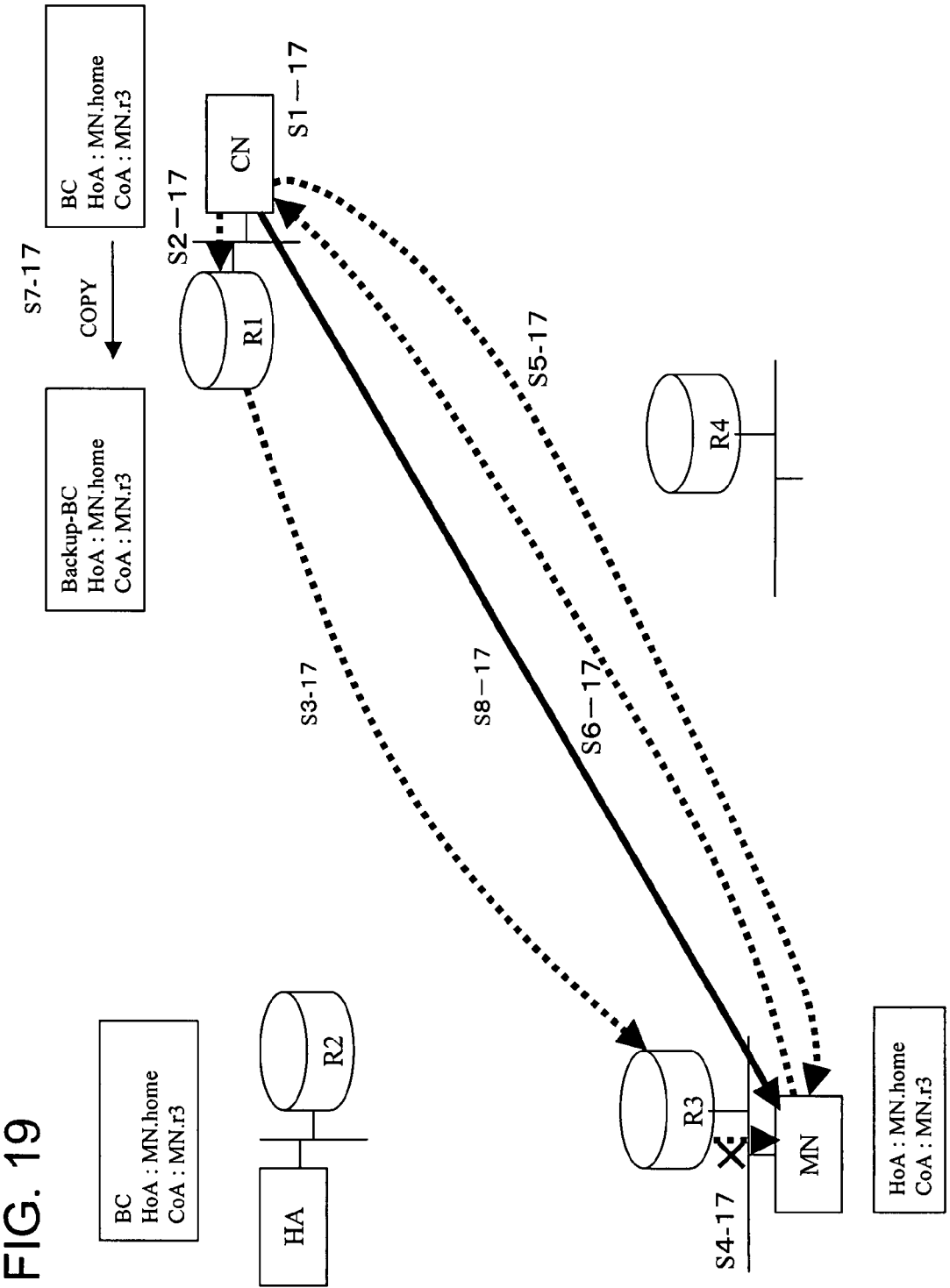
FIG. 19 shows a third method of recovering the binding cache of the correspondent node CN of MIPv6 according to the present invention.

FIG. 19 shows a third method of recovering the binding cache of the correspondent node CN of MIPv6 according to the present invention which illustrates a second example of the procedure for making the position information of the backup binding cache BBC valid.

In FIG. 19, when a fault occurs in the correspondent node CN (step S1-17) and the correspondent node CN is reactivated, a search is conducted to determine if position information is stored in the backup binding cache BBC and, if stored, a position registration request is transmitted to the multicast address of the mobile terminal MN (step S2-17). In response, router R1 transfers a position registration request addressed to the multicast address in accordance with the multicast transfer rules (step S3-17).

On the other hand, when router R3 does not support multicast addresses, a multicast destination position registration request cannot be transferred (step S4-17). When a response is not sent back to the position registration request addressed to the multicast address, the correspondent node CN transmits the position registration request to the unicast address (CoA) stored in the backup binding cache BBC (step S5-17).

Upon receipt of the position registration request from the correspondent node CN, the mobile terminal MN transmits a position registration (step S6-17). When the correspondent node CN receives the position registration from the mobile terminal MN, the correspondent node CN starts to maintain the position information and copies the binding cache BC to the backup binding cache BBC (step S7-17). The correspondent node CN transmits the packets addressed to the mobile terminal MN that holds the binding cache BC in accordance with the binding cache BC (step S8-17).

Figure 20:
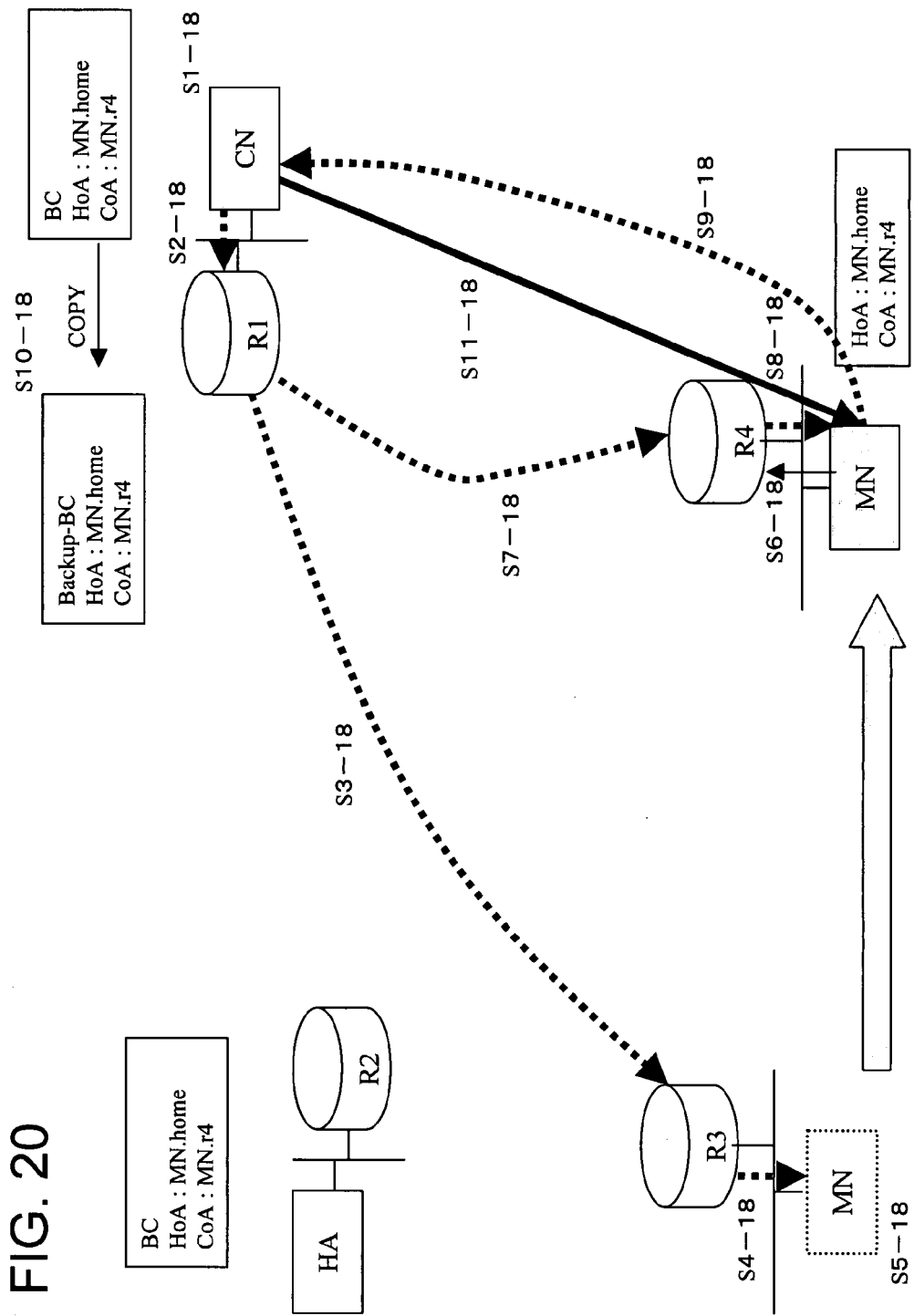
FIG. 20 shows a fourth method of recovering the binding cache of the correspondent node CN of MIPv6 according to the present invention.

FIG. 20 shows a fourth method of recovering the binding cache of the correspondent node CN of MIPv6 according to the present invention and shows a third example of a procedure for making the position information of the backup binding cache BBC valid.

In FIG. 20, when a fault occurs in the correspondent node CN (step S1-18) and the correspondent node CN is reactivated, a search is conducted to determine if position information is stored in the backup binding cache BBC and, if stored, a position registration request is transmitted to the multicast address of the mobile terminal MN (step S2-18).

Router R1 transfers a position registration request addressed to the multicast address in accordance with the multicast transfer rules (step S3-18). Router R3 transfers a position registration request addressed to the multicast address in accordance with the multicast transfer rules (step S4-18).

However, because the mobile terminal MN has moved to another link to which the router R4 belongs before the correspondent node CN is reactivated, the mobile terminal MN is unable to receive the position registration request (step S5-18). The mobile terminal MN registers the multicast group ID to the neighboring router R4 after moving (step S6-18).

Router R4 transfers the position registration request from the correspondent node CN that is addressed to the multicast address via the router R1 in accordance with the multicast transfer rules (step S7-18). The mobile terminal MN does not implement position registration with respect to the correspondent node CN after moving but the position registration request can be received because registration of the multicast address after the move is performed with respect to the router R4 (step S8-18).

Upon receiving the position registration request from the correspondent node CN, the mobile terminal MN transmits a position registration (step S9-18). Upon receipt of the position registration from the mobile terminal MN, the correspondent node CN starts maintaining the position information and copies the binding cache BC to the backup binding cache BBC (step S10-18).

Thereafter, the correspondent node CN transmits packets addressed to the mobile terminal MN that hold the binding cache BC in accordance with the binding cache BC (step S11-18).

Figure 21:
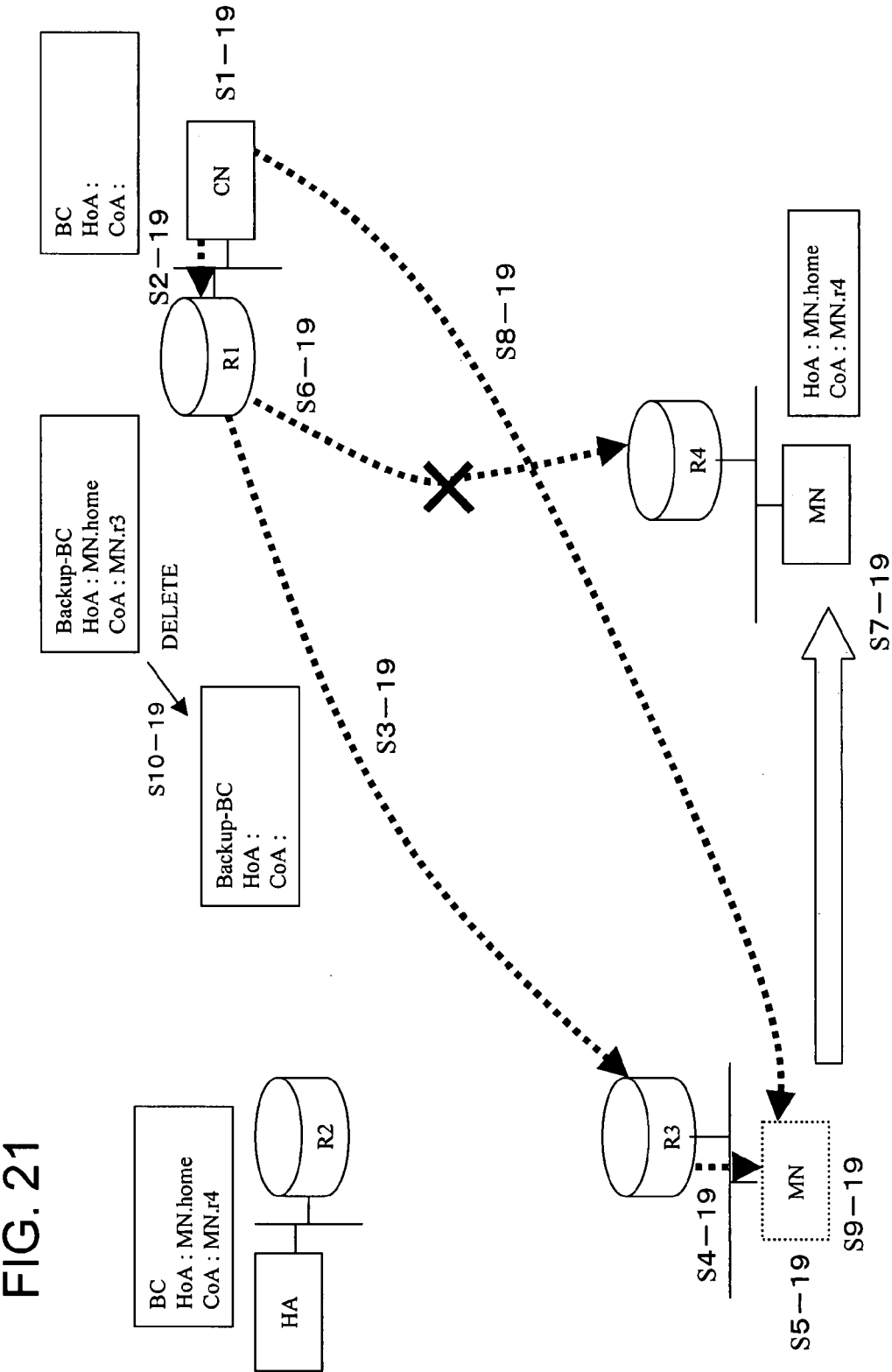
FIG. 21 shows a fifth method of recovering the binding cache of the correspondent node CN of MIPv6 according to the present invention.

FIG. 21 shows a fifth method of recovering the binding cache of the correspondent node CN of MIPv6 according to the present invention that illustrates a procedure that makes the position information of the backup binding cache BBC valid.

In FIG. 21, the procedure from steps S1-19 to S5-19 is the same as the procedure of steps S1-18 to S5-18 in FIG. 20.

In addition, in FIG. 21, because router R1 has not been able to establish a path for a packet transfer with respect to the multicast address to the router R4 which is the neighboring router of the movement destination of the mobile terminal MN, multicast destination packets are not transferred (step S6-19). Accordingly, when a response to the position registration request to the multicast address has not been sent back to the mobile terminal MN because of a state where the position registration to the multicast address has not arrived (step S7-19), the correspondent node CN transmits the position registration request to the unicast address (CoA) that is stored to the backup binding cache BBC (step S8-19).

At the same time, because the mobile terminal MN has moved to another link that belongs to the router R4 before the correspondent node CN is reactivated, the mobile terminal MN is unable to receive the position registration request (step S9-19). Therefore, the correspondent node CN recognizes the position information stored in the backup binding cache BBC as being invalid when there is a response to the position registration request transmitted to the mobile terminal MN and erases the position information of the backup binding cache (step S10-19).

Figure 22:
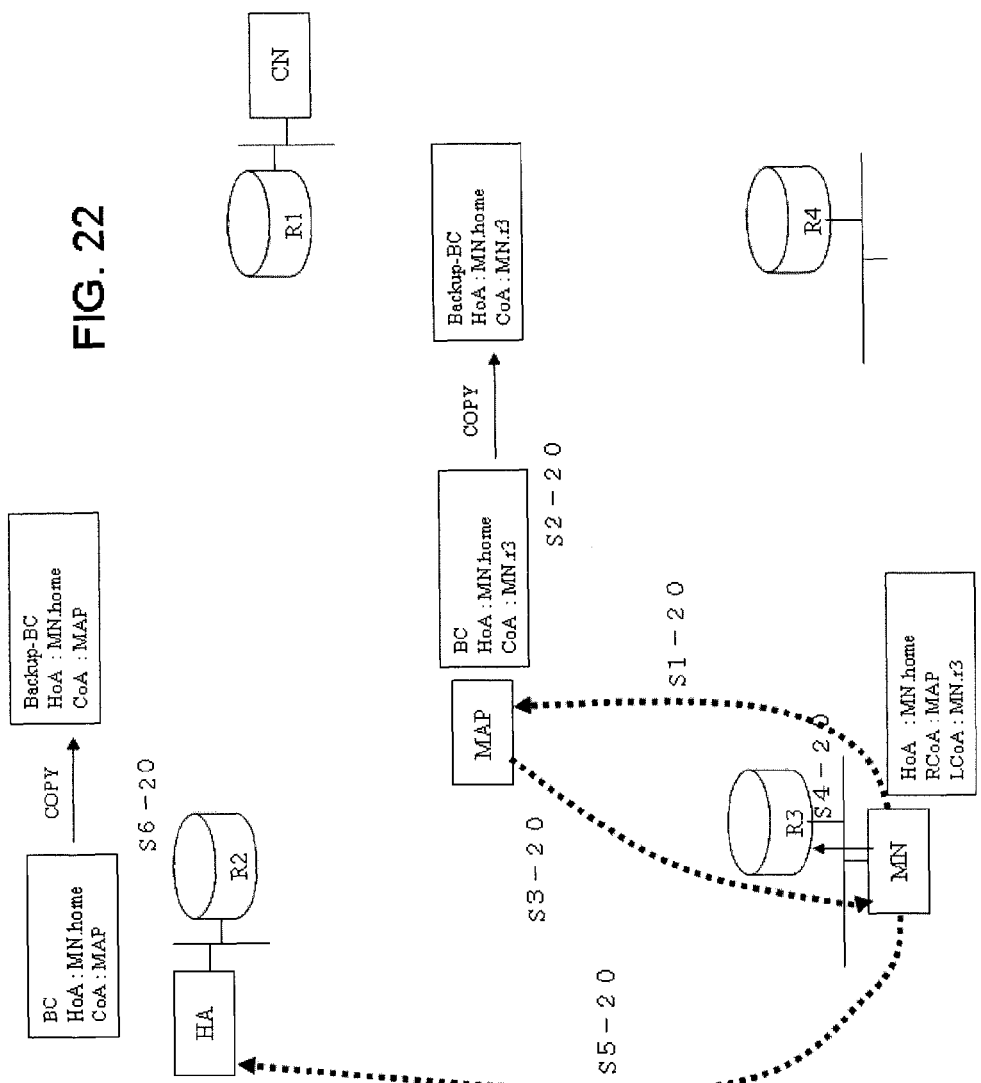
FIG. 22 shows a first method of recovering the binding cache of the mobile anchor point MAP of hierarchical MIPv6 according to the present invention.

FIG. 22 shows a first method of recovering the binding cache of the mobile anchor point MAP of hierarchical MIPv6 according to the present invention that illustrates the procedure for copying position information to the binding cache BC and registering the multicast address.

In FIG. 22, when the mobile terminal MN recognizes movement, the mobile terminal MN transmits a position registration to the mobile anchor point MAP (step S1-20). In response, upon receiving the position registration from the mobile terminal MN, the mobile anchor point MAP maintains the position information of the mobile terminal MN as the backup binding cache BC. Thereupon, the binding cache is copied to the backup binding cache BC (step S2-20).

The mobile anchor point MAP sends back a registration response in response to the position registration from the mobile terminal MN. Here, the response contains a multicast address (step S3-20). When a multicast address exists when the registration response from the mobile anchor point MAP is received, the mobile terminal MN registers the multicast group ID with the neighboring router R3 (step S4-20).

Figure 23:
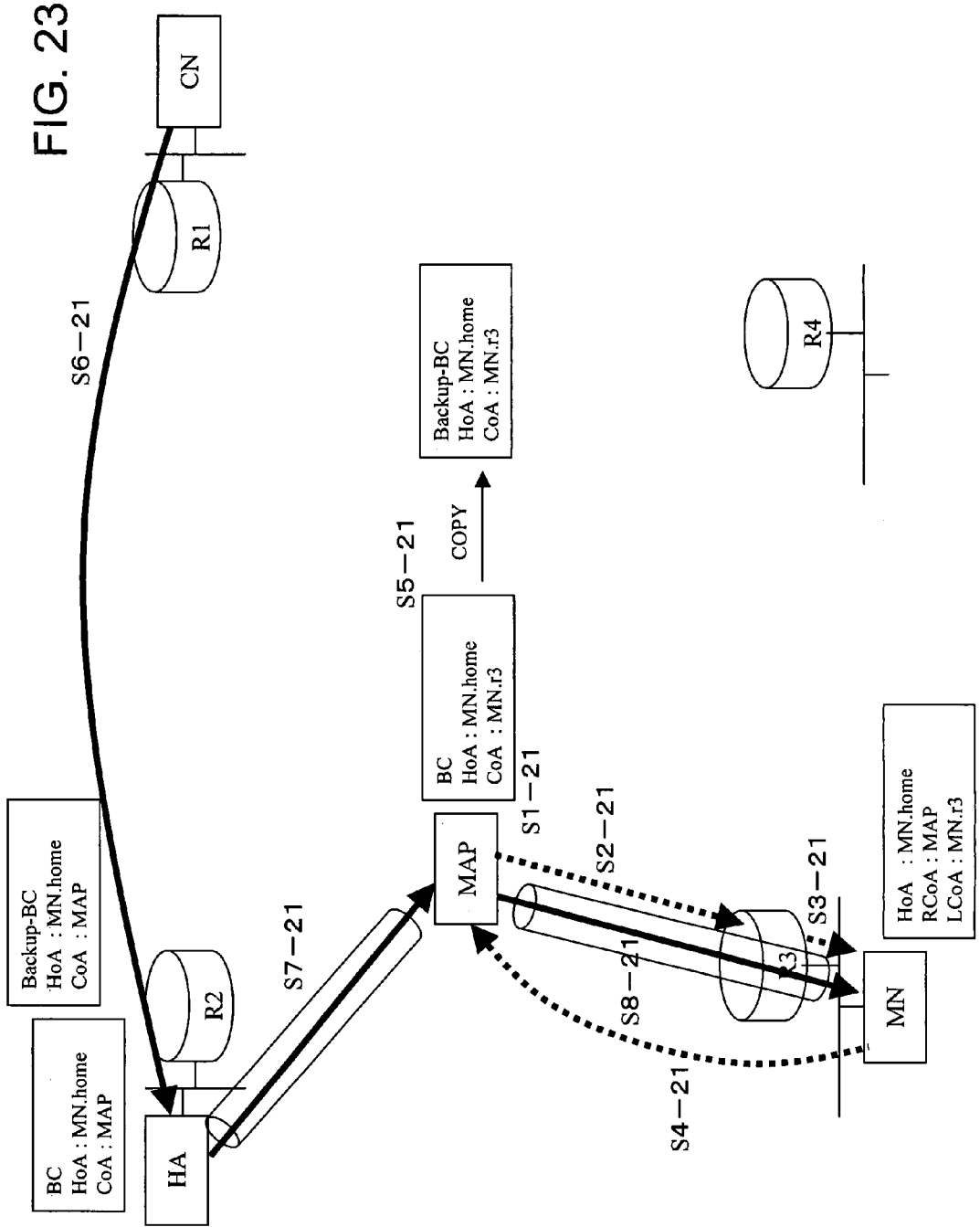
FIG. 23 shows a second method of recovering the binding cache of the mobile anchor point MAP of hierarchical MIPv6 according to the present invention.

In addition, when the mobile terminal MN recognizes movement, the mobile terminal MN transmits a position registration to the home agent HA (step S5-20). In response, upon receiving the position registration from the mobile terminal MN, the home agent HA manages the position information of the mobile terminal MN as the backup binding cache BC. Thereupon, the binding cache BC is copied to the backup binding cache BBC (step S6-20). FIG. 23 shows a second method of recovering the binding cache of the mobile anchor point MAP of hierarchical MIPv6 according to the present invention and illustrates a first procedure that makes the position information of the backup binding cache BBC valid.

In FIG. 23, when a fault occurs in the mobile anchor point MAP (steps S1-21) and the mobile anchor point MAP is reactivated, a search is conducted to determined if position information is stored in the backup binding cache BBC and, if stored, a position registration request is transmitted to the multicast address of the mobile terminal (step S2-21).

Router R3 transfers a position registration request addressed to the multicast address in accordance with the multicast transfer rules (step S3-21). Upon receipt of the position registration request from the mobile anchor point MAP, the mobile terminal MN transmits the position registration (step S4-21).

Upon receipt of the position registration from the mobile terminal MN, the mobile anchor point MAP starts maintaining the position information and copies the binding cache BC to the binding cache BBC (step S5-21).

The correspondent node CN transmits packets addressed to the home address of the mobile terminal MN (step S6-21). The home agent HA transfers packets addressed to the mobile terminal MN that holds the binding cache BC in accordance with the binding cache BC (step S7-21).

The mobile anchor point MAP transfers packets addressed to the mobile terminal MN that holds the binding cache BC in accordance with the binding cache BC (step S8-21).

Figure 24:
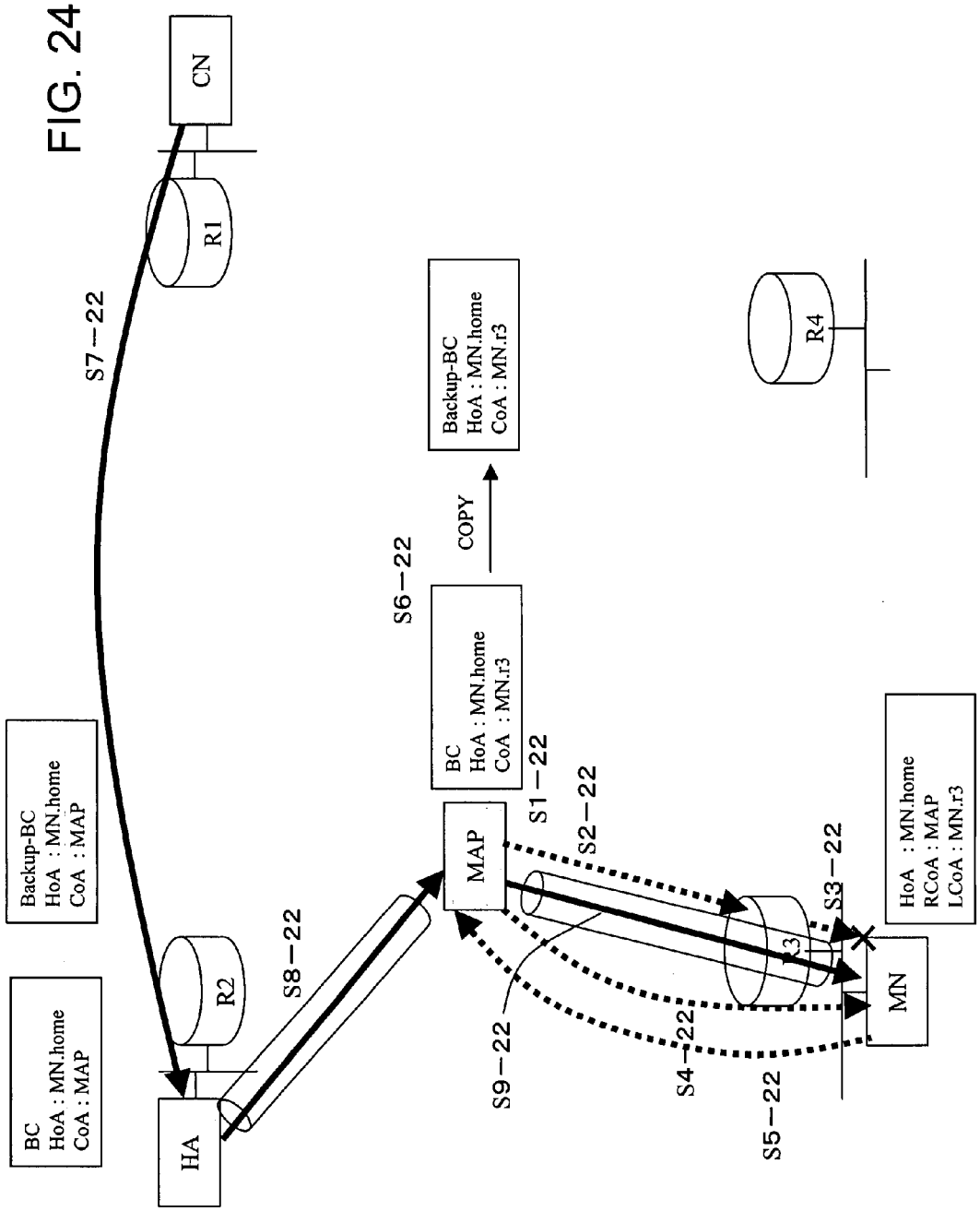
FIG. 24 shows a third method of recovering the binding cache of the mobile anchor point MAP of hierarchical MIPv6 according to the present invention.

FIG. 24 shows a third method of recovering the binding cache of the mobile anchor point MAP of hierarchized MIPv6 according to the present invention that illustrates a second procedure that makes the position information of the backup binding cache BBC valid. In FIG. 24, when a fault occurs in the mobile anchor point MAP (step S1-22) and the mobile anchor point MAP is reactivated, a search is conducted to determine if position information is stored in the backup binding cache BBC and, if stored, a position registration request is transmitted to the multicast address of the mobile terminal (step S2-22).

When the router R3 does not support multicast addresses, the position registration request to the multicast address cannot be transferred (step S3-22). Hence, when a response to the position registration request to the multicast address has not been sent back, the mobile anchor point MAP transmits a position registration request to the unicast address (CoA) stored in the backup binding cache BBC (step S4-22).

Upon receipt of the position registration request from the mobile anchor point MAP, the mobile terminal MN transmits a position registration (step S5-22). Upon receipt of the position registration from the mobile terminal MN, the mobile anchor point MAP starts maintaining the position information and copies the binding cache BC to the backup binding cache BBC (step S6-22).

The correspondent node CN sends packets addressed to the mobile terminal MN to the home address (step S7-22). In response, the home agent HA transfers packets addressed to the mobile terminal MN that hold the binding cache BC in accordance with the binding cache BC (step S8-22). In addition, the mobile anchor point MAP transfers packets addressed to the mobile terminal MN that holds the binding cache BC in accordance with the binding cache BC (step S9-22).

Figure 25:
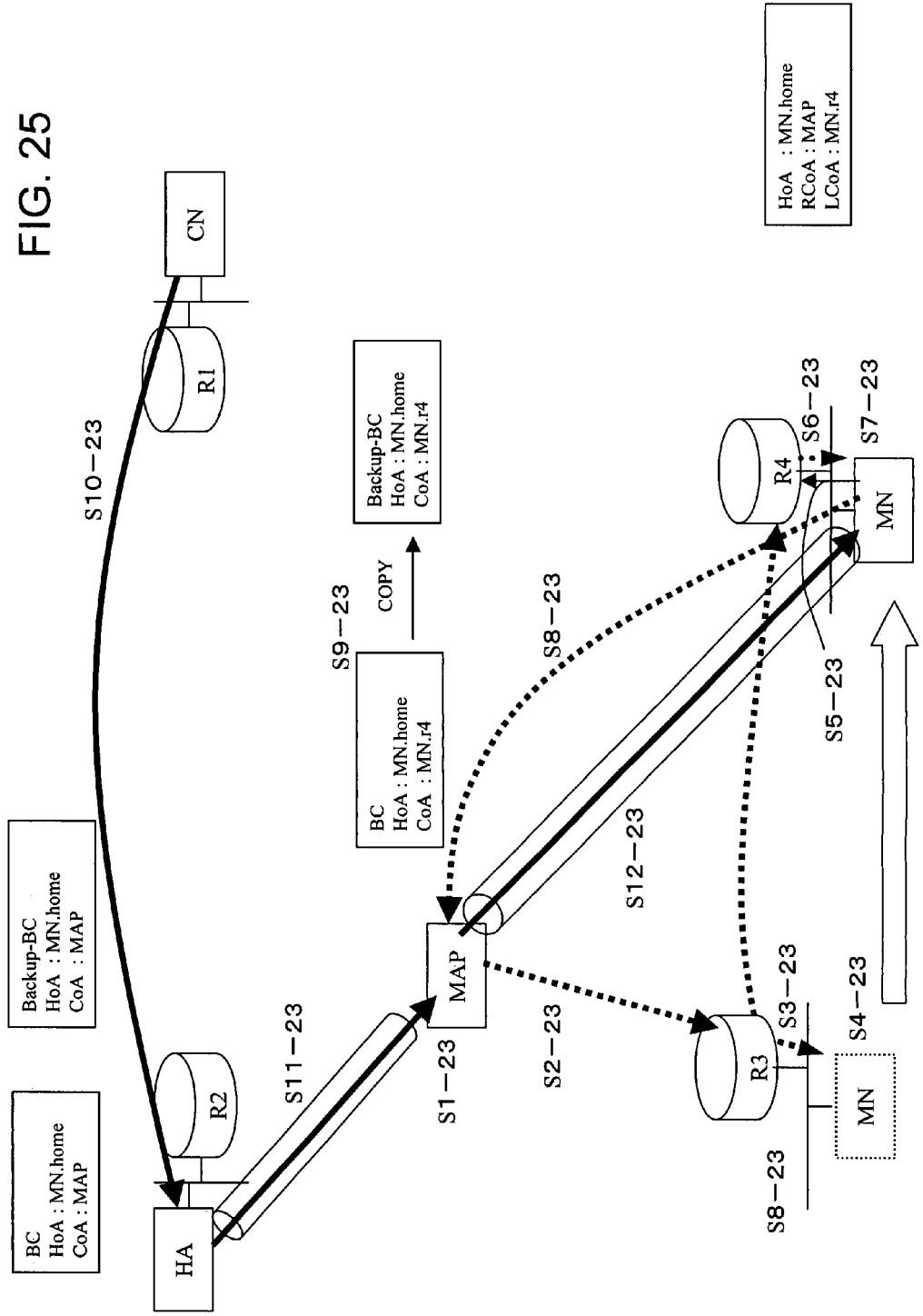
FIG. 25 shows a fourth method of recovering the binding cache of the mobile anchor point MAP of hierarchical MIPv6 according to the present invention.

FIG. 25 shows a first method of recovering the binding cache of the mobile anchor point MAP of hierarchical MIPv6 according to the present invention that illustrates a fourth procedure that makes the position information of the backup binding cache BBC valid. In FIG. 25, when a fault occurs in the mobile anchor point MAP (step S1-23) and the mobile anchor point MAP is reactivated, a search is conducted to determine if position information is stored in the backup binding cache BBC and, if stored, a position registration request is transmitted to the multicast address (step S2-23). In response, the router R3 transfers a position registration request addressed to the multicast address in accordance with the multicast transfer rules (step S3-23).

Because the mobile terminal MN has moved to another link to which the router R4 belongs before the mobile anchor point MAP is reactivated, the mobile terminal MN is unable to receive the position registration request (step S4-23). The mobile terminal MN registers the multicast group ID with the neighboring router R4 after moving (step S5-23). The router R4 transfers the position registration request addressed to the multicast address in accordance with the multicast transfer rules (step S6-23). The mobile terminal MN does not perform position registration with respect to the mobile anchor point MAP after moving but is able to receive a position registration request because registration of the multicast address is made with respect to the router R4 after moving (step S7-23).

The mobile terminal MN transmits a position registration upon receiving the position registration request from the mobile anchor point MAP (step S8-23). Upon receipt of the position registration from the mobile terminal MN, the mobile anchor point MAP starts maintaining the position information and copies the binding cache BC to the backup binding cache BBC (step S9-23).

Packets are transmitted from the correspondent node CN to the home address of the mobile terminal MN (step S10-23). Upon receiving the packets, the home agent HA transfers packets addressed to the mobile terminal MN that holds the binding cache BC in accordance with the binding cache BC (step S11-23).

Thereafter, the mobile anchor point MAP transfers packets addressed to the mobile terminal MN that holds the binding cache BC (step S12-13).

Figure 26:
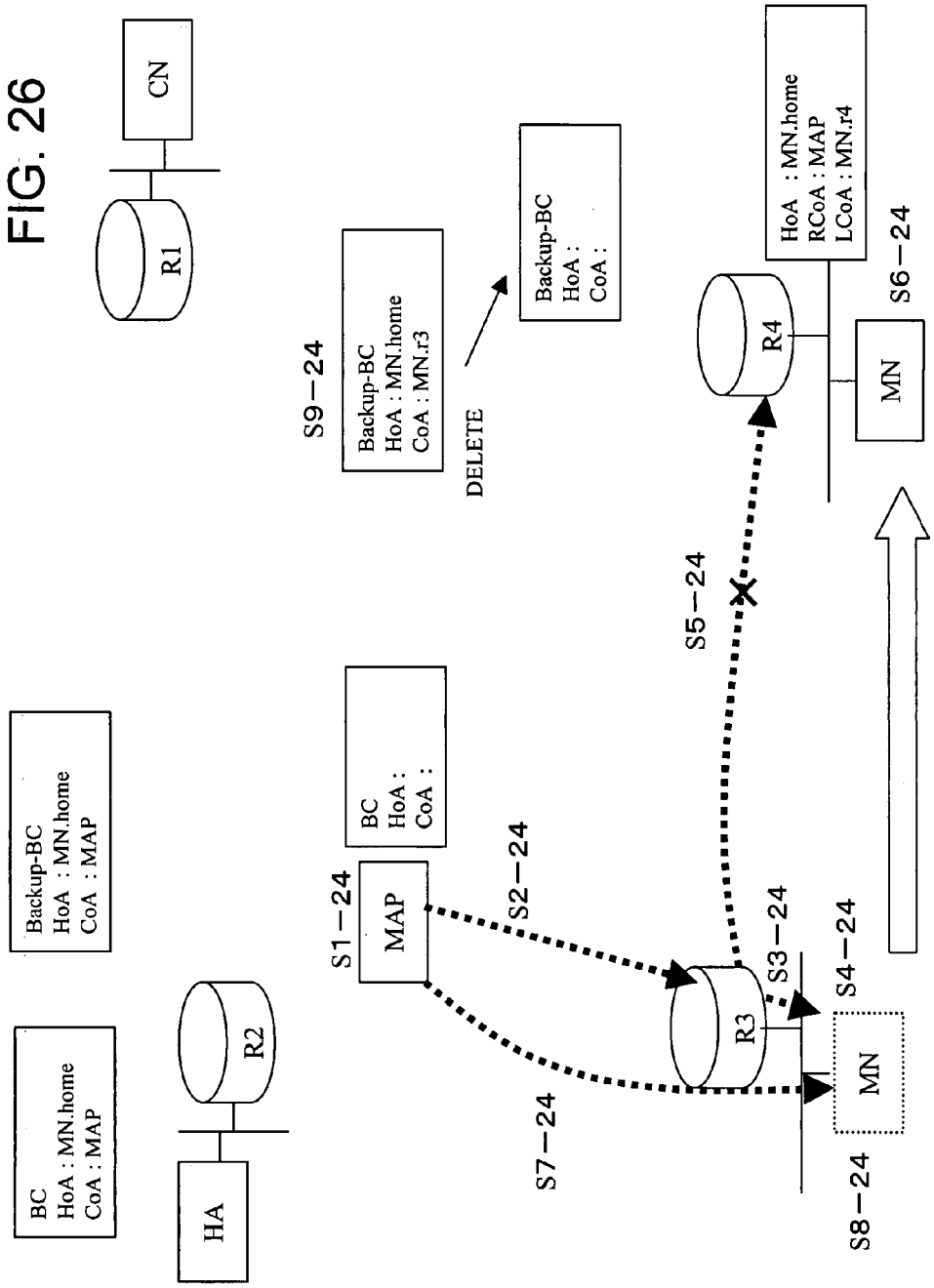
FIG. 26 shows a fifth method of recovering the binding cache of the mobile anchor point MAP of hierarchical MIPv6 according to the present invention.

FIG. 26 shows a fifth method of recovering the binding cache of the mobile anchor point MAP of hierarchized MIPv6 according to the present invention that illustrates the position information invalidation procedure of the backup binding cache BBC. In FIG. 26, when a fault occurs in the mobile anchor point MAP (step S1-24) and the mobile anchor point MAP is then reactivated, a search is conducted to determine whether position information is stored in the backup binding cache BBC and, if stored, a position registration request is transmitted to the multicast address of the mobile terminal MN (step S2-24).

Router R3 transfers a position registration request addressed to the multicast address in accordance with the multicast transfer rules (step S3-24). Here, because the mobile terminal MN has moved to another link to which the router R4 belongs before the mobile anchor point MAP is reactivated, the mobile terminal MN is unable to receive the position registration request (step S4-24).

Because the router R3 is unable to establish a path for a packet transfer with respect to the multicast address to the neighboring router R4 of the movement destination of the mobile terminal MN, packets addressed to the multicast address are not transferred (step S5-24). Therefore, the position registration request addressed to the multicast address does not arrive at the mobile terminal MN (step S6-24).

When a response to the position registration request addressed to the multicast address has not been sent back, the mobile anchor point MAP transmits the position registration request to the unicast address (CoA) stored in the backup binding cache BBC (step S7-24).

Here, because the mobile terminal MN has moved to another link before the mobile anchor point MAP is reactivated, the position registration request cannot be received (step S8-24).

When there is no response to the position registration request transmitted to the mobile terminal MN, the mobile anchor point MAP recognizes the position information stored in the backup binding cache BBC as invalid and erases the position information of the backup binding cache BBC (step S9-24).

FIGS. 27 to 33 show a function constitutional example of a method of recovering the binding cache of the home agent HA. The correspondent node CN and mobile anchor point MAP can also be implemented by the same functional constitution as that of the home agent HA.

Figure 27B:
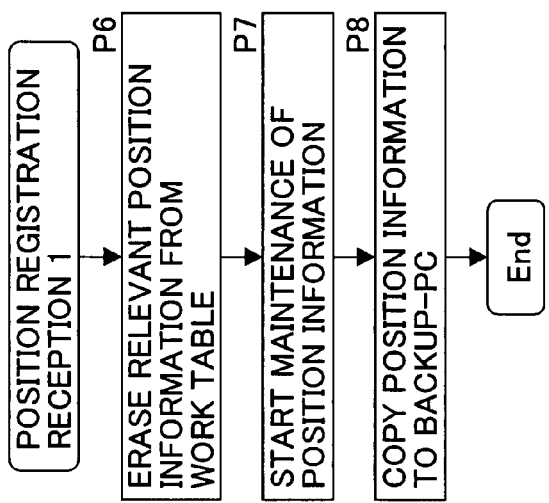
FIGS. 27A-27C is a first flowchart for the binding cache recovery of the home agent HA.
Figure 27C:
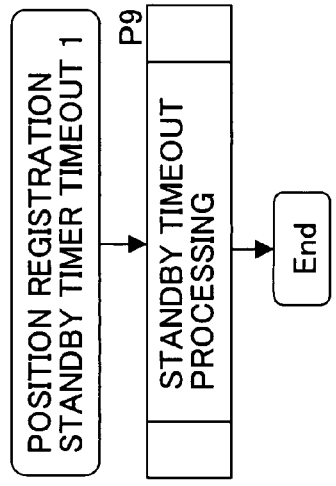
Figure 27A:
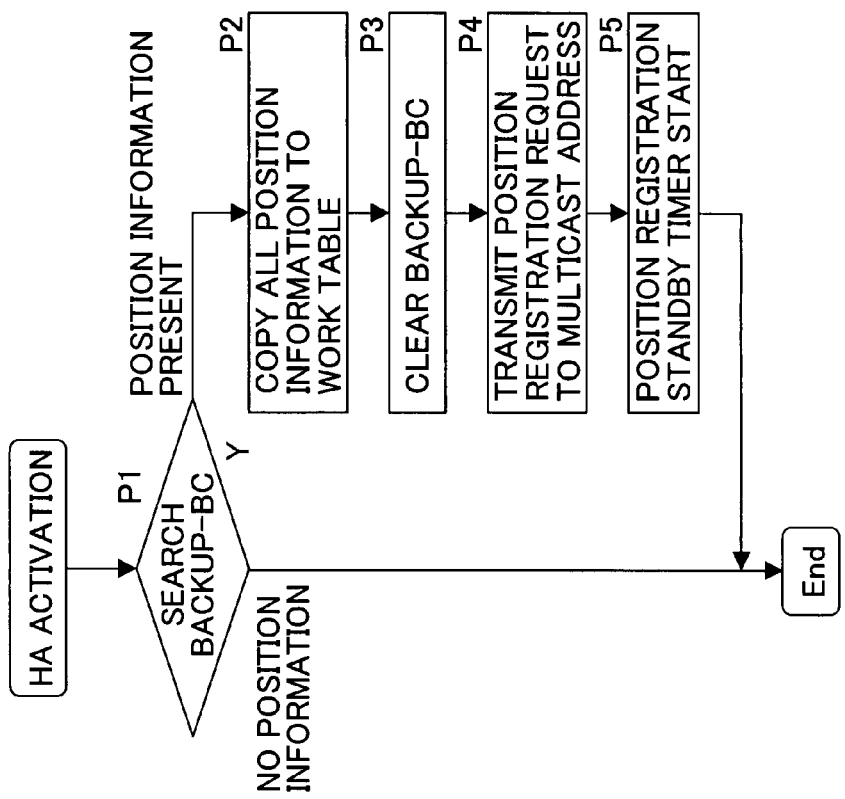

FIG. 27 shows a first flowchart of the method of recovering the binding cache of the home agent HA. In FIG. 27A, when the home agent HA is activated, the backup binding cache BBC is searched (processing step P1) and, if there is position information (processing steps P1, Y), all the position information is copied to a work table (processing step P2).

Thereafter, the backup binding cache BBC is erased (processing step P3) and a position registration request is transmitted to the multicast address (processing step P4). Thereupon, a position registration standby timer is started (processing step P5).

When a position registration is received as shown in FIG. 27B during the counting of the position registration standby timer, position information is erased from the work table (processing step P6) and the position information maintenance is started (processing step P7). The position information is then copied to the backup binding cache BBC (processing step P8).

On the other hand, when the position registration standby timer times out, standby timeout processing is performed (processing step P9, FIG. 27C).

FIG. 28 shows a second flowchart for the method of recovering the binding cache of the home agent HA. The details of the timeout processing (processing step P9) are shown and, in FIG. 28A, the work table is searched when the position registration standby timer times out. When position information is present (processing step P91, Y), a position information registration request is sent as a unicast to the position information mobile terminal MN (processing step P92).

Thereupon, the position registration standby timer is started (processing step P93), and a delay is introduced to prevent an increase in the load of the home agent HA (processing step P94). In this processing, as shown in FIG. 28B, the position registration standby timer is stopped when the position registration is received (processing step P95). Accordingly thereafter, position information maintenance management is started (processing step P96) and position information is copied to the backup binding cache BBC (processing step P97).

On the other hand, when the position registration is not received and a timeout of the position registration standby timer is produced, the position information is erased from the backup binding cache BBC (processing step P98, FIG. 28C).

Figure 29:
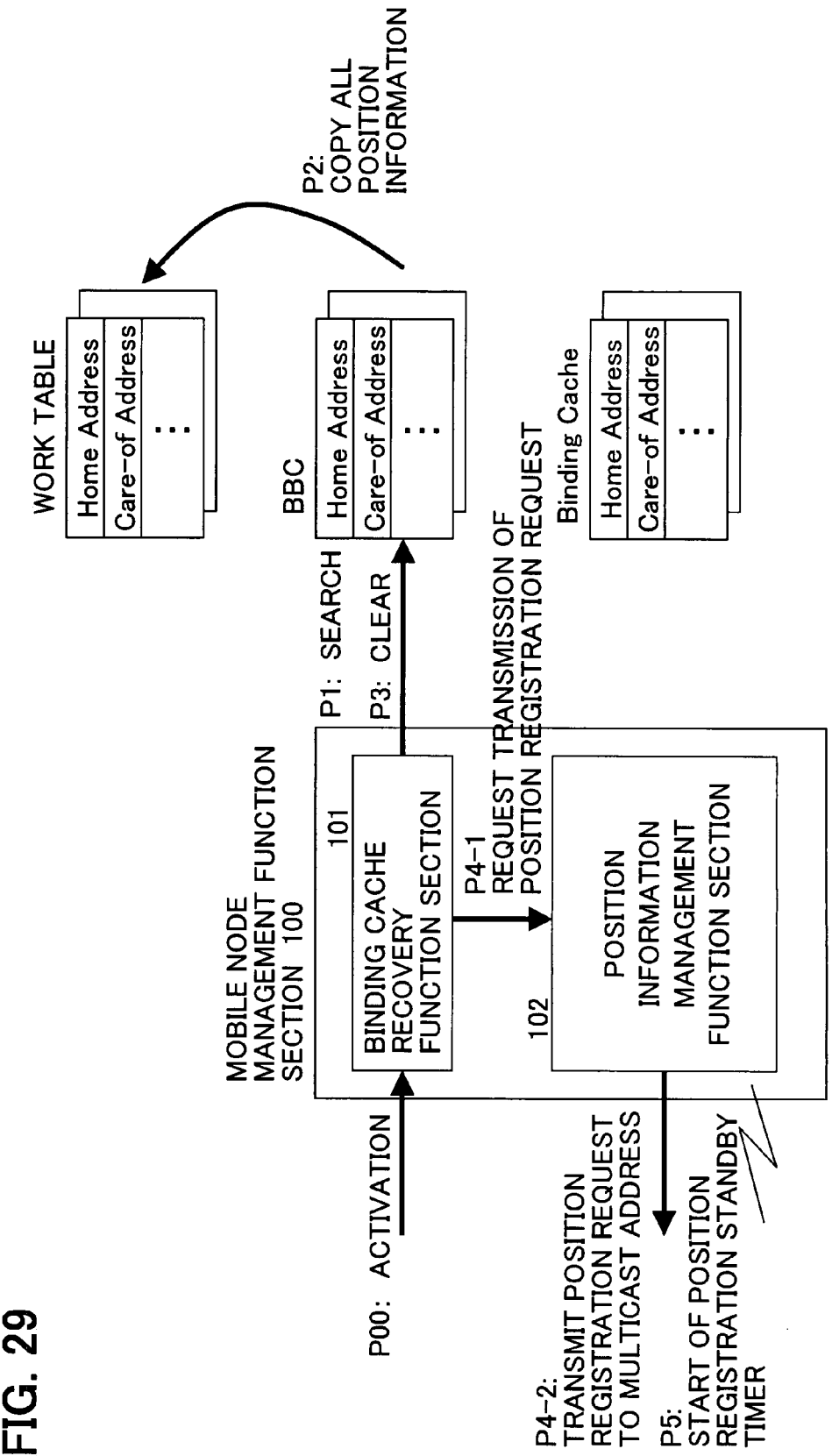
FIG. 29 shows the processing when the home agent HA of the constitution for the binding cache recovery of the home agent HA starts up.

FIG. 29 shows the processing when the home agent HA of the constitution for the binding cache recovery of the home agent HA starts up. The processing corresponds to the processing flow that is started at 'HA activation' in FIG. 27A. When an 'activation' (processing step P00) instruction is sent to the binding cache recovery function section 101 of the mobile terminal management function section 100 of the home agent HA, the backup binding cache BBC is searched (processing step P1) and, when the binding cache BC exists, 'all the position information is copied (processing step P2) to the work table and the backup binding cache BBC region is cleared' (processing step P3).

Thereafter, a request to transmit a position registration request is sent to a position information management function section 102 (processing step P4-1). The position information management function section 102 correspondingly transmits a position registration request to the multicast address (processing step P4-2). Thereafter, the position registration standby timer is started (processing step P5). The processing to search the backup binding cache BBC (processing step P1) ends at the point where the binding cache BC is detected in the backup binding cache BBC.

Figure 30:
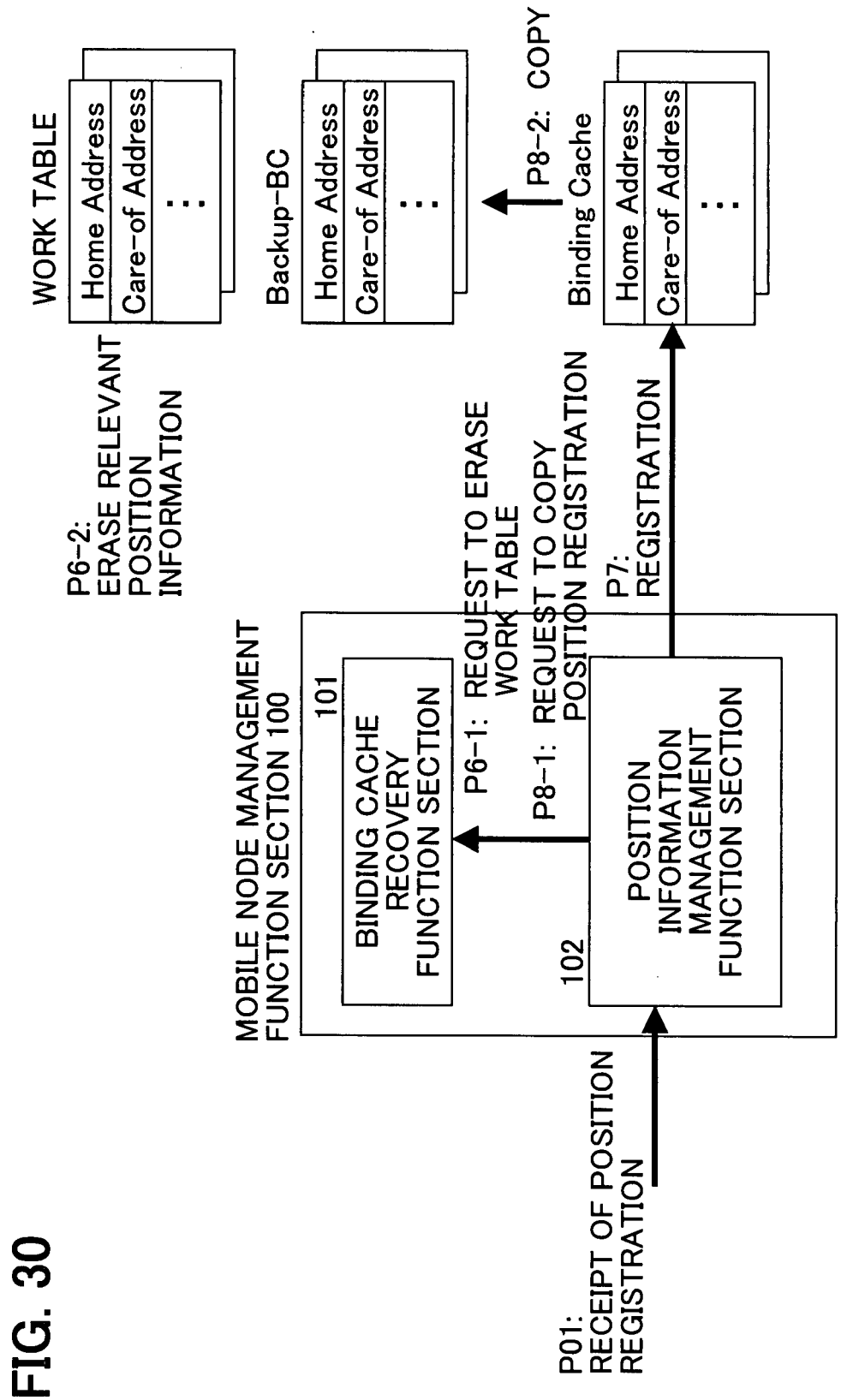
FIG. 30 shows first position registration reception processing of the constitution for the binding cache recovery of the home agent HA.

FIG. 30 shows first position registration reception processing of the constitution for the binding cache recovery of the home agent HA which illustrates processing that corresponds to the process flow in a case where the home agent HA of FIG. 27B receives a position registration.

In FIG. 30, when the position information management function section 102 receives the position registration (processing step P01), a request to erase the work table (processing P6-1) is sent to the binding cache recovery function section 101 and the position information is erased from the work table (processing step P6-2). Thereafter, the position registration thus received is registered as the binding cache BC (processing step P7) and the maintenance of the binding cache BC is started. Thereupon, a request to copy the position registration information is sent from the position information management function section 102 to the binding cache recovery function section 101 (processing step P8-1) and the binding cache BC is copied to the backup binding cache BBC (processing step P8-2).

Figure 31:
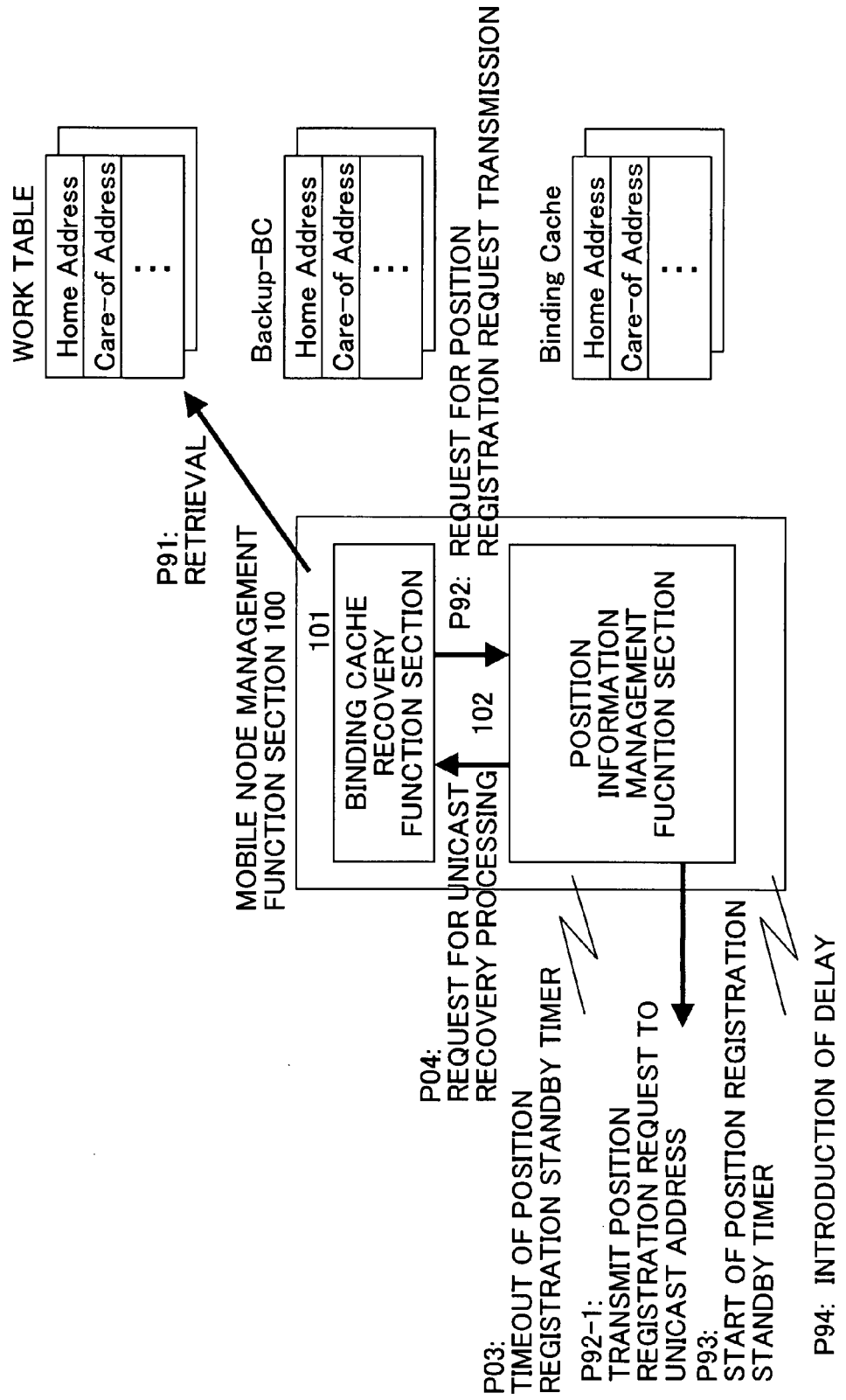
FIG. 31 shows reception standby timeout of the constitution of the binding cache recovery of the home agent HA.

FIG. 31 shows standby timeout processing of the constitution of the binding cache recovery of the home agent HA. FIG. 31 shows the processing in a case where the position registration standby timer times out in the home agent HA and provides details of the timeout processing (processing step P10) of the timer that is started at the standby timer start (processing step P5) of the position registration of FIG. 27A, followed by the details of the advanced processing of the timeout processing of the position registration standby timer of FIG. 28.

In FIG. 31, when the position registration standby timer timeout is produced (processing step P03), a request for unicast recovery processing is sent from the position information management function section 102 to the binding cache recovery function section 101 (processing step P04) and the binding cache recovery function section 101 that received the request then searches work table (processing step P91).

When the binding cache BC is registered in the work table, a request to transmit a position registration request is sent to the position information management function section 102 (processing step P92), a position registration request transmission is output to the unicast address (processing step P92-1), and the timer is started by the start of the position registration standby timer (processing step P93). Thereafter, a delay is introduced in order to control congestion (processing step P94). The search (processing step P91) is repeated until the position information has been removed from the work table.

Figure 32:
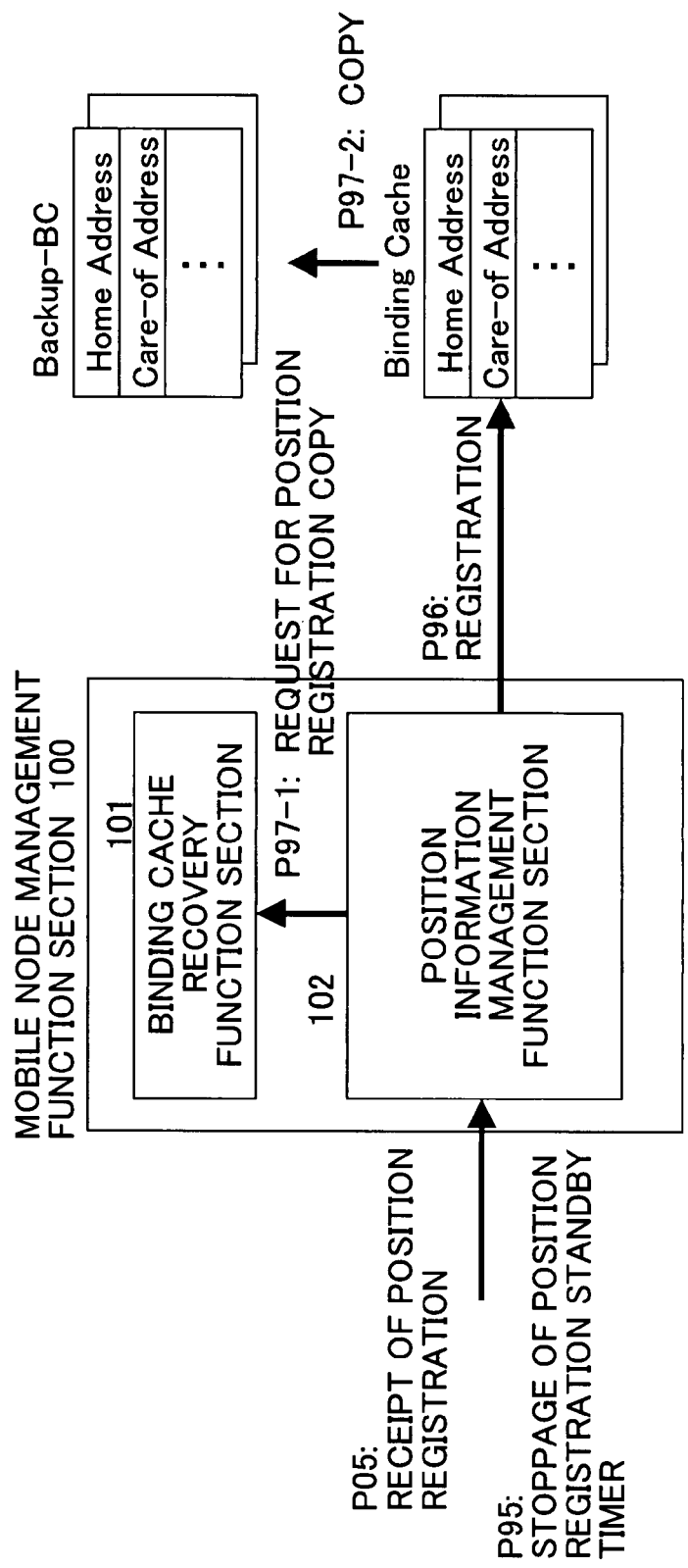
FIG. 32 shows second position registration reception processing of the constitution for the binding cache recovery of the home agent HA.

FIG. 32 shows second position registration reception processing of the constitution for the binding cache recovery of the home agent HA that illustrates the processing in a case where the home agent HA receives a position registration in response to the position registration request addressed to a unicast address. This corresponds to the flowchart processing that is started in the position registration reception 2 of FIG. 28B.

In FIG. 32, when the position information management function section 102 receives position information reception (processing step P05), the position registration standby timer stops (processing step P95), position information is registered in the binding cache BC and the processing to maintain the position information is started (processing step P96). Thereafter, a request to copy the position information is sent from the position information management function section 102 to the binding cache recovery function section 101 (processing step P97-1) and the binding cache BC is copied to the backup binding cache BBC (processing step P97-2).

Figure 33:
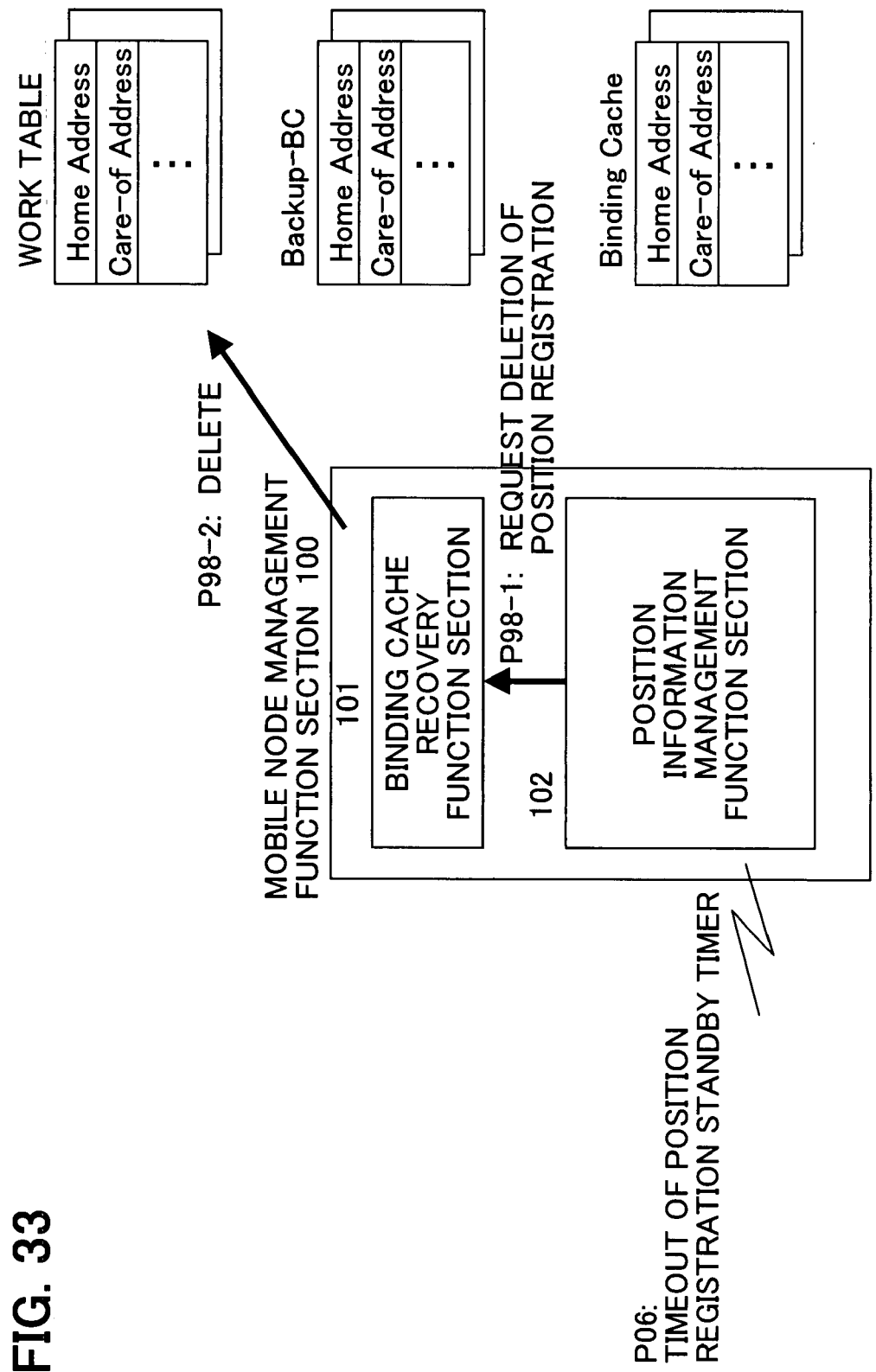
FIG. 33 shows second timeout processing for reception standby of the position registration of the constitution for the binding cache recovery of the home agent HA.

FIG. 33 shows second standby timeout processing of the position registration of the constitution for the binding cache recovery of the home agent HA which shows the processing in a case where the position registration standby timer times out in the home agent HA. The standby timeout processing of FIG. 28A is timer timeout processing that is started at the start (processing step P93) of the position registration standby timer.

This corresponds to the part of the flowchart that is started at timeout 2 of the position registration standby timer of FIG. 28C.

When the position information management function section 102 receives the position registration standby timer timeout (processing step P06), a request to erase the position information is sent to the binding cache recovery function section 101 (processing step P98-1) and the corresponding position information is erased from the work table (processing step P98-2).

Figure 34B:
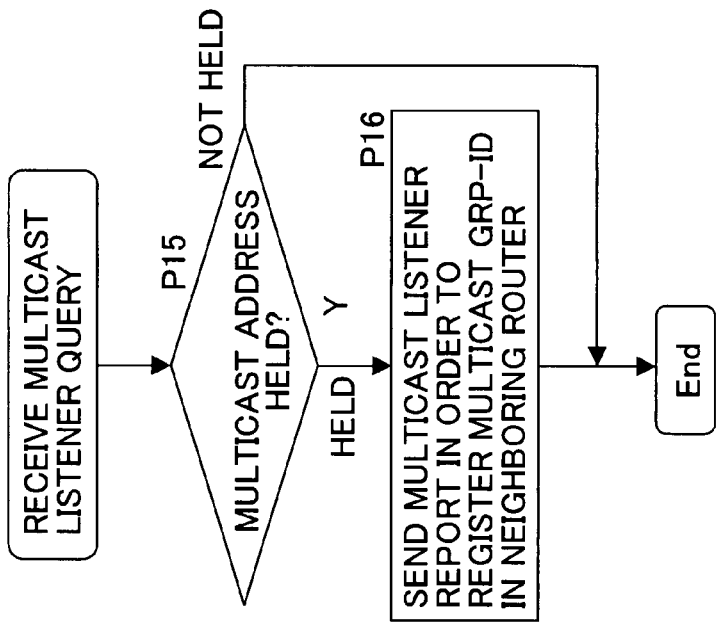
FIGS. 34A-34B shows a flowchart for the binding cache recovery method of the mobile terminal MN.
Figure 34A:
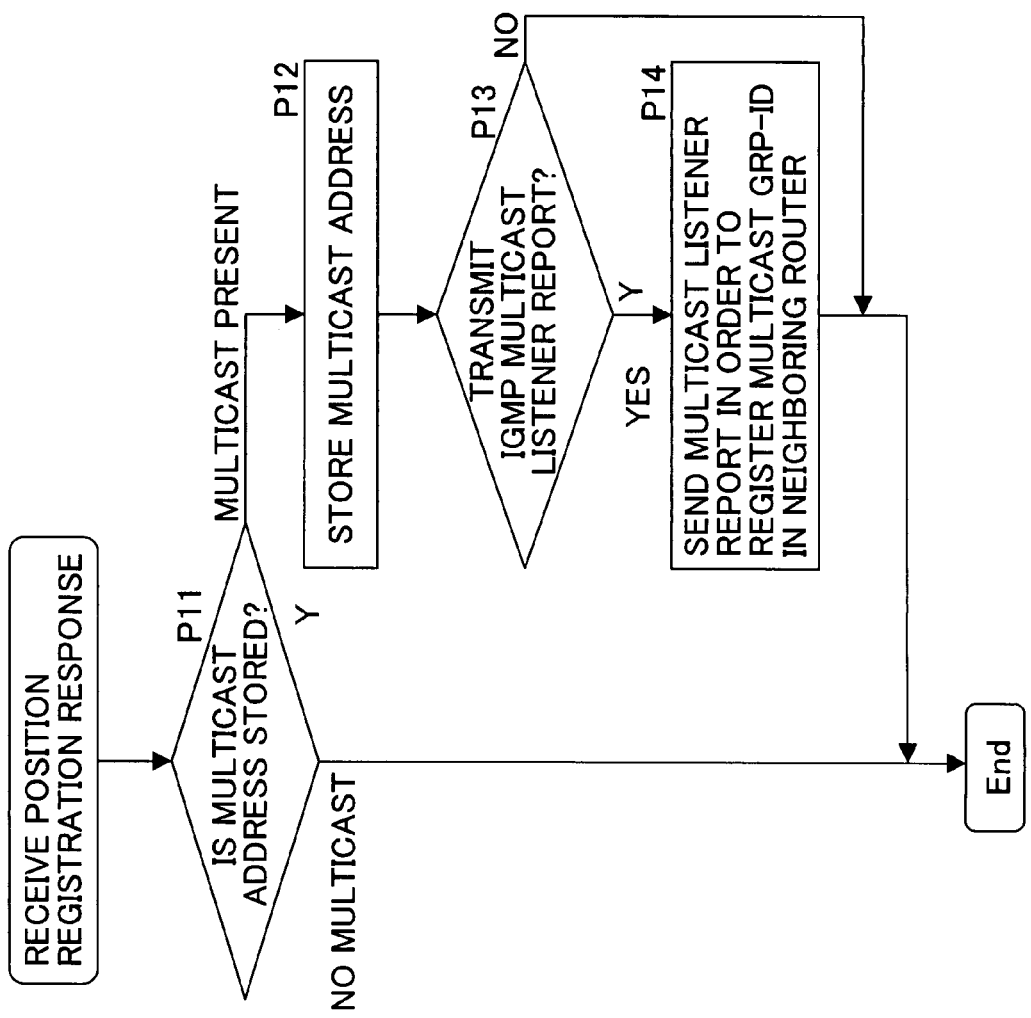
Figure 35:
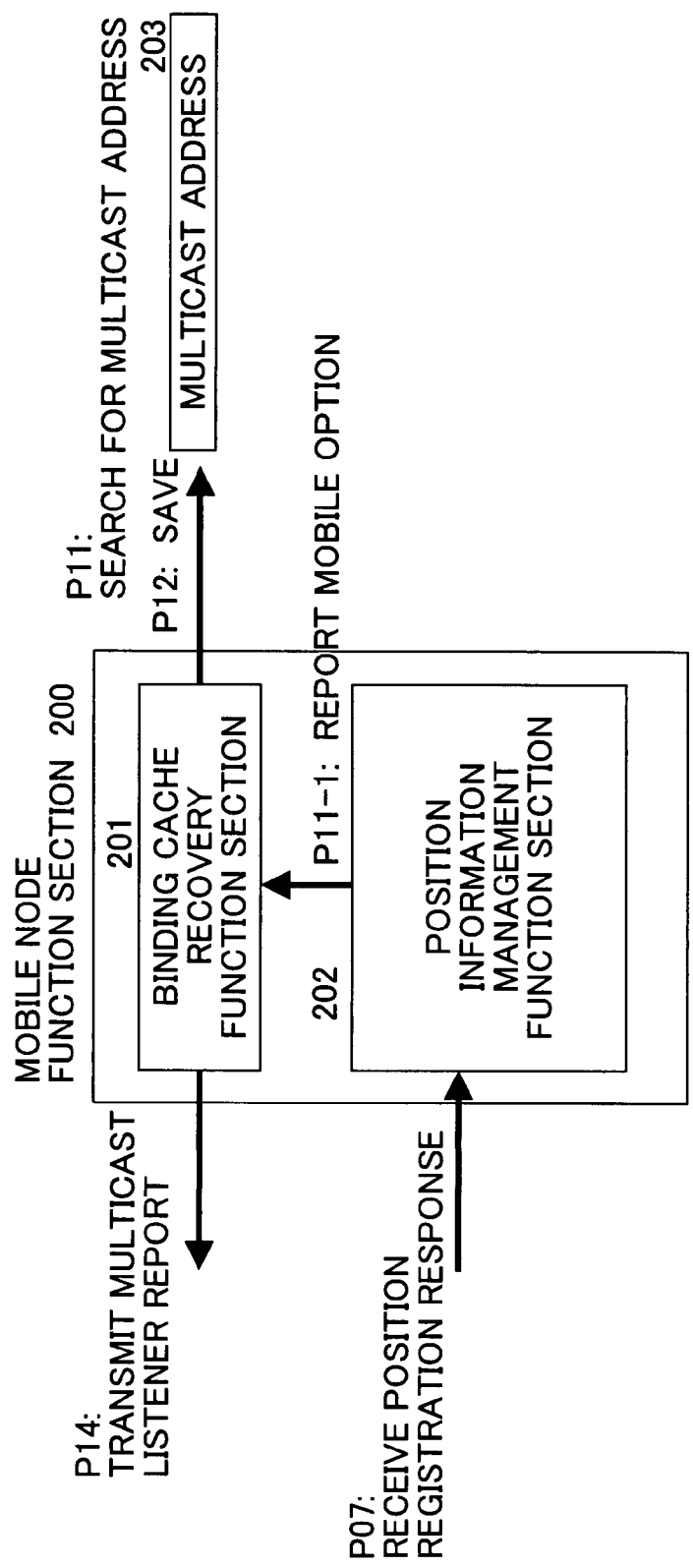
FIG. 35 illustrates reception of a position registration response in the constitutional example of the binding cache recovery of the mobile terminal MN.
Figure 36:
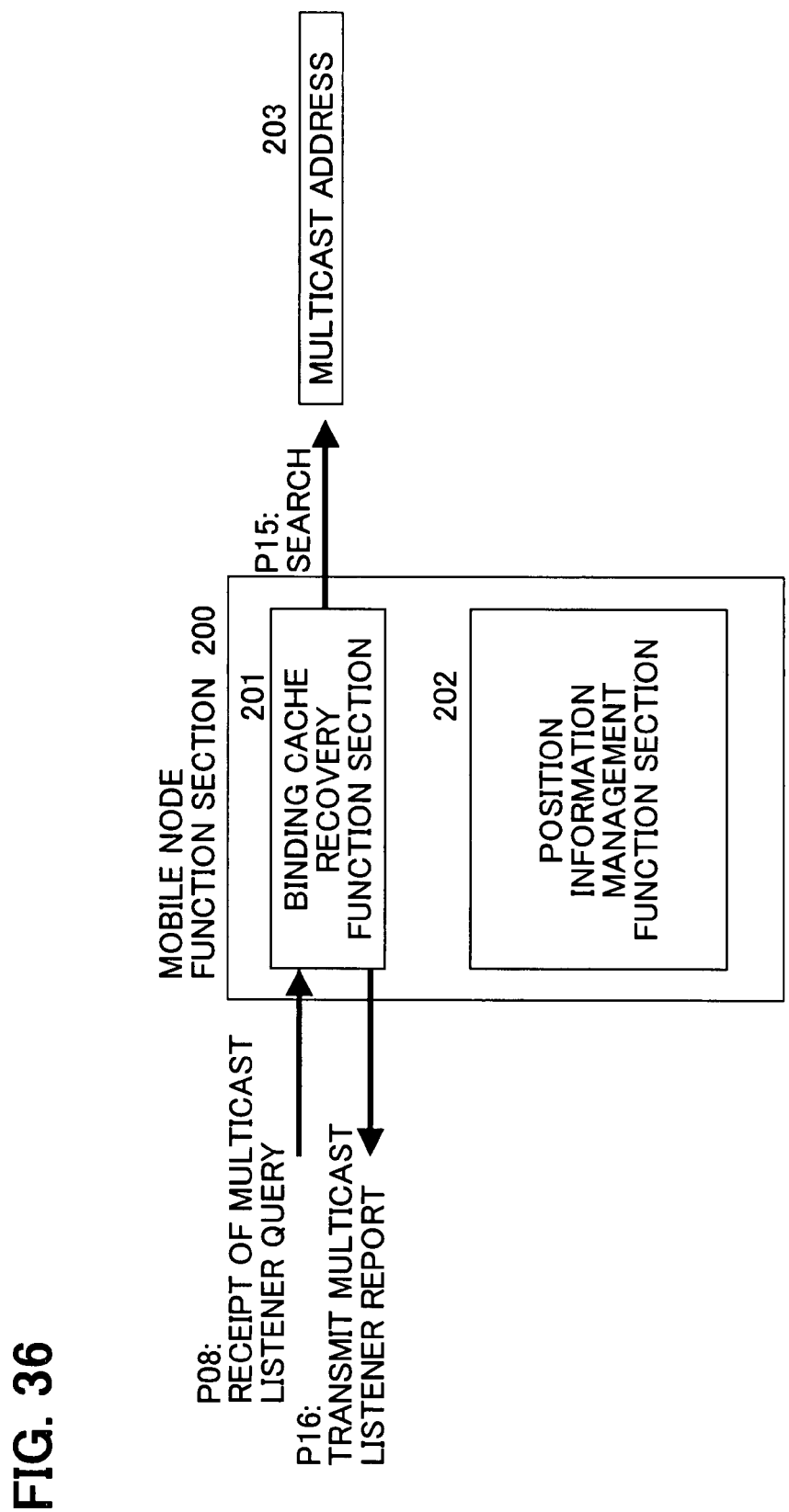
FIG. 36 illustrates a multicast listener query reception in the constitutional example of the binding cache recovery of the mobile terminal MN.

FIGS. 34 to 36 show function constitutional examples of the binding cache recovery system of the mobile terminal MN.

FIG. 34 shows a flowchart of the binding cache recovery system of the mobile terminal MN. FIG. 34 shows the flow of the processing of the mobile terminal function section 200 corresponding to FIGS. 35 and 36.

In FIGS. 34A and 35, when the mobile terminal MN receives a position registration request from the node that manages the position information (processing step P07), the position information management function section 202 sends a movement option report to the binding cache recovery function section 201 (processing step P11-1). The binding cache recovery function section 201 searches for the multicast address on the basis of the movement option (processing step P11) and, when a multicast address exists (processing step P11, Y), the multicast address is stored in a multicast storage table 203 (processing step P12).

Thereafter, if it is possible to transmit a "Multicast Listener Report" because the multicast group ID is registered in the neighboring router (processing step P13, Y), the transmission is executed (processing step P14). Here, the decision on whether the "Multicast Listener Report" can be transmitted is made in accordance with the rules of IGMP which is the multicast protocol (if necessary, the Multicast Listener Report is transmitted by way of response to a "Multicast Listener Query" from the neighboring router).

In addition, FIGS. 34B and 36 show processing for a case where a "Multicast Listener Query" is received by the mobile terminal MN. When the binding cache recovery function section 201 receives the "Multicast Listener Query" (processing step P08), a search for the multicast address storage table 203 is made (processing step P15) and, when a multicast address is held (processing step P15, Y), the "Multicast Listener Report" is transmitted (processing step P16).

INDUSTRIAL APPLICABILITY

According to the present invention, when a fault occurs in the node that is managing position information and restoration is performed, the position information can be restored simply by transmitting a position registration request addressed to one multicast address without transmitting a plurality of position registration requests to a plurality of mobile terminals MN and packet transfers from the correspondent node CN to the mobile terminal MN can be performed without waiting for the position registration by the mobile terminal MN and packet loss from the correspondent node CN to the mobile terminal MN can be reduced. An efficient communication system can thus be provided.

The invention claimed is:

1. A mobile communication network system, comprising:
   a home agent and a mobile anchor point which are nodes each connected to a network,
   wherein each of the nodes receives a position registration from a mobile terminal, creates a backup binding cache by copying the binding cache, and maintains and manages the backup binding cache; and
   the home agent searches the backup binding cache in the event of fault recovery and acquires a binding cache that has been held prior to the fault, designates a pre-registered multicast address for the mobile terminal stored in the acquired binding cache and sends a position registration request packet to the pre-registered multicast address of the mobile terminal, renders the acquired binding cache valid when there is a response from the mobile terminal with respect to the position registration request packet sent to the pre-registered multicast address and continues to maintain and manage the acquired binding cache, and
   when there is no response from the mobile terminal to the position registration request packet sent to the multicast address, the home agent sends the position registration request packet to a unicast address of the mobile terminal, and, when there is no response from the mobile terminal to the position registration request sent to the unicast address, renders the acquired binding cache invalid and deletes the acquired binding cache.

2. The mobile communication network system according to claim 1, wherein the registration of position information is transmitted from the mobile terminal to the multicast address by way of response to the registration of the position information from the home agent.

3. The mobile communication network system according to claim 1, wherein the home agent uses Mobile Internet Protocol.

4. The mobile communication network system according to claim 1, wherein the home agent uses Hierarchical Mobile Internet Protocol.

5. A mobile communication network system, comprising:
a home agent and a mobile anchor point which are nodes each connected to a network,
wherein each of the nodes receives a position registration from a mobile terminal, creates a backup binding cache by copying the binding cache, and maintains and manages the backup binding cache; and
the mobile anchor point searches the backup binding cache in the event of fault recovery and acquires a binding cache that has been held prior to the fault, designates a pre-registered multicast address for the mobile terminal stored in the acquired binding cache and sends a position registration request packet to the pre-registered multicast address of the mobile terminal, renders the acquired binding cache valid when there is a response from the mobile terminal with respect to the position registration request packet sent to the pre-registered multicast address and continues to maintain and manage the acquired binding cache, and
when there is no response from the mobile terminal to the position registration request packet sent to the multicast address, the home agent sends the position registration request packet to a unicast address of the mobile terminal, and, when there is no response from the mobile terminal to the position registration request sent to the unicast address, renders the acquired binding cache invalid and deletes the acquired binding cache.

6. The mobile communication network system according to claim 5, wherein the registration of position information is transmitted from the mobile terminal to the multicast address by way of response to the registration of the position information from the mobile anchor point.

7. The mobile communication network system according to claim 6, wherein the mobile anchor point uses Mobile Internet Protocol.

8. The mobile communication network system according to claim 6, wherein the mobile anchor point uses Hierarchical Mobile Internet Protocol.

9. A mobile communication network system, comprising:
a home agent, a mobile anchor point, and a correspondent node which are nodes each connected to a network,
wherein each of the nodes receives a position registration from a mobile terminal, creates a backup binding cache by copying the binding cache, and maintains and manages the backup binding cache; and
the correspondent node searches the backup binding cache in the event of fault recovery and acquires a binding cache that has been held prior to the fault, designates a pre-registered multicast address for the mobile terminal stored in the acquired binding cache and sends a position registration request packet to the pre-registered multicast address of the mobile terminal, renders the acquired binding cache valid when there is a response from the mobile terminal with respect to the position registration request packet sent to the pre-registered multicast address and continues to maintain and manage the acquired binding cache, and
when there is no response from the mobile terminal to the position registration request packet sent to the multicast address, the home agent sends the position registration request packet to a unicast address of the mobile terminal, and, when there is no response from the mobile terminal to the position registration request sent to the unicast address, renders the acquired binding cache invalid and deletes the acquired binding cache.

10. The mobile communication network system according to claim 9, wherein the registration of position information is transmitted from the mobile terminal to the multicast address by way of response to the registration of the position information from the correspondent node.

11. The mobile communication network system according to claim 9, wherein the correspondent node uses Mobile Internet Protocol.

12. The mobile communication network system according to claim 9, wherein the correspondent node uses Hierarchical Mobile Internet Protocol.

13. The mobile communication network system according to claim 1, wherein the mobile terminal uses Mobile Internet Protocol and, by means of a multicast address contained in a position information registration response, performs registration of a multicast group identifier (GRP-ID) by using a Multicast Listener Report of Internet Management Protocol (IGMP: Internet Group Management Protocol) in a neighboring router.

14. The mobile communication network system according to claim 5, wherein the mobile terminal uses Mobile Internet Protocol and, by means of a multicast address contained in a position information registration response, performs registration of a multicast group identifier (GRP-ID) by using a Multicast Listener Report of Internet Management Protocol (IGMP: Internet Group Management Protocol) in a neighboring router.

15. The mobile communication network system according to claim 9, wherein the mobile terminal uses Mobile Internet Protocol and, by means of a multicast address contained in a position information registration response, performs registration of a multicast group identifier (GRP-ID) by using a Multicast Listener Report of Internet Management Protocol (IGMP: Internet Group Management Protocol) in a neighboring router.

16. The mobile communication network system according to claim 1, wherein a router by which the position registration request packet is sent to the pre-registered multicast address of the mobile terminal does not support multicast addresses.

* * * * *